(12) United States Patent
Airoldi

(10) Patent No.: US 12,163,297 B1
(45) Date of Patent: Dec. 10, 2024

(54) ADJUSTABLE TAKEOFF PLATFORM FOR AERIAL VEHICLES

(71) Applicant: Amazon Technologies, Inc., Seattle, WA (US)

(72) Inventor: Simone M. Airoldi, Melrose, MA (US)

(73) Assignee: Amazon Technologies, Inc., Seattle, WA (US)

(*) Notice: Subject to any disclaimer, the term of this patent is extended or adjusted under 35 U.S.C. 154(b) by 1193 days.

(21) Appl. No.: 16/666,250

(22) Filed: Oct. 28, 2019

(51) Int. Cl.
*E01F 3/00* (2006.01)

(52) U.S. Cl.
CPC ...................... *E01F 3/00* (2013.01)

(58) Field of Classification Search
CPC ............ B64F 1/007; B64F 1/0297; E01F 3/00
USPC ........... 244/110 E, 114 E, 114 R, 116 R, 116
See application file for complete search history.

(56) References Cited

U.S. PATENT DOCUMENTS

| | | | |
|---|---|---|---|
| 9,630,713 B1* | 4/2017 | Von Novak, III | B64C 25/52 |
| 2005/0230537 A1* | 10/2005 | Chouery | B64F 1/007 |
| | | | 244/116 |
| 2009/0043487 A1* | 2/2009 | Gellert | B64F 1/00 |
| | | | 244/114 R |
| 2009/0140885 A1* | 6/2009 | Rogers | G01S 17/95 |
| | | | 356/28 |
| 2012/0136562 A1* | 5/2012 | Mere | G08G 5/0021 |
| | | | 701/120 |
| 2016/0347446 A1* | 12/2016 | Vetter | B64C 27/30 |
| 2018/0327091 A1* | 11/2018 | Burks | B64F 1/007 |
| 2019/0100331 A1* | 4/2019 | Wright | B64F 1/007 |
| 2020/0198803 A1* | 6/2020 | Zhou | B66F 7/065 |
| 2022/0144451 A1* | 5/2022 | Tighe | B64F 1/007 |

* cited by examiner

*Primary Examiner* — Jessica L Laux
(74) *Attorney, Agent, or Firm* — Athorus, PLLC

(57) ABSTRACT

Described are systems and methods for adjusting a takeoff platform for a vertical takeoff and landing (VTOL) aerial vehicle. The described systems and methods allow a VTOL aerial vehicle to be oriented prior to takeoff to reduce the effects that a VTOL aerial vehicle may experience due to weather conditions at takeoff. In view of the aerodynamic characteristics of a VTOL aerial vehicle and certain weather conditions, a heading, pitch, and/or roll of the VTOL can be provided to counteract the effects the VTOL may experience from the weather conditions at takeoff.

20 Claims, 15 Drawing Sheets

ADJUSTABLE TAKEOFF PLATFORM FOR AERIAL VEHICLES

BACKGROUND

Vertical takeoff and landing (VTOL) aerial vehicles are often prone to drift caused by the wind during takeoff. These effects of the wind typically impact VTOL aerial vehicles until the aerial vehicle has had sufficient time to adjust its attitude to counteract the forces of the wind.

DETAILED DESCRIPTION

Figure 1A:
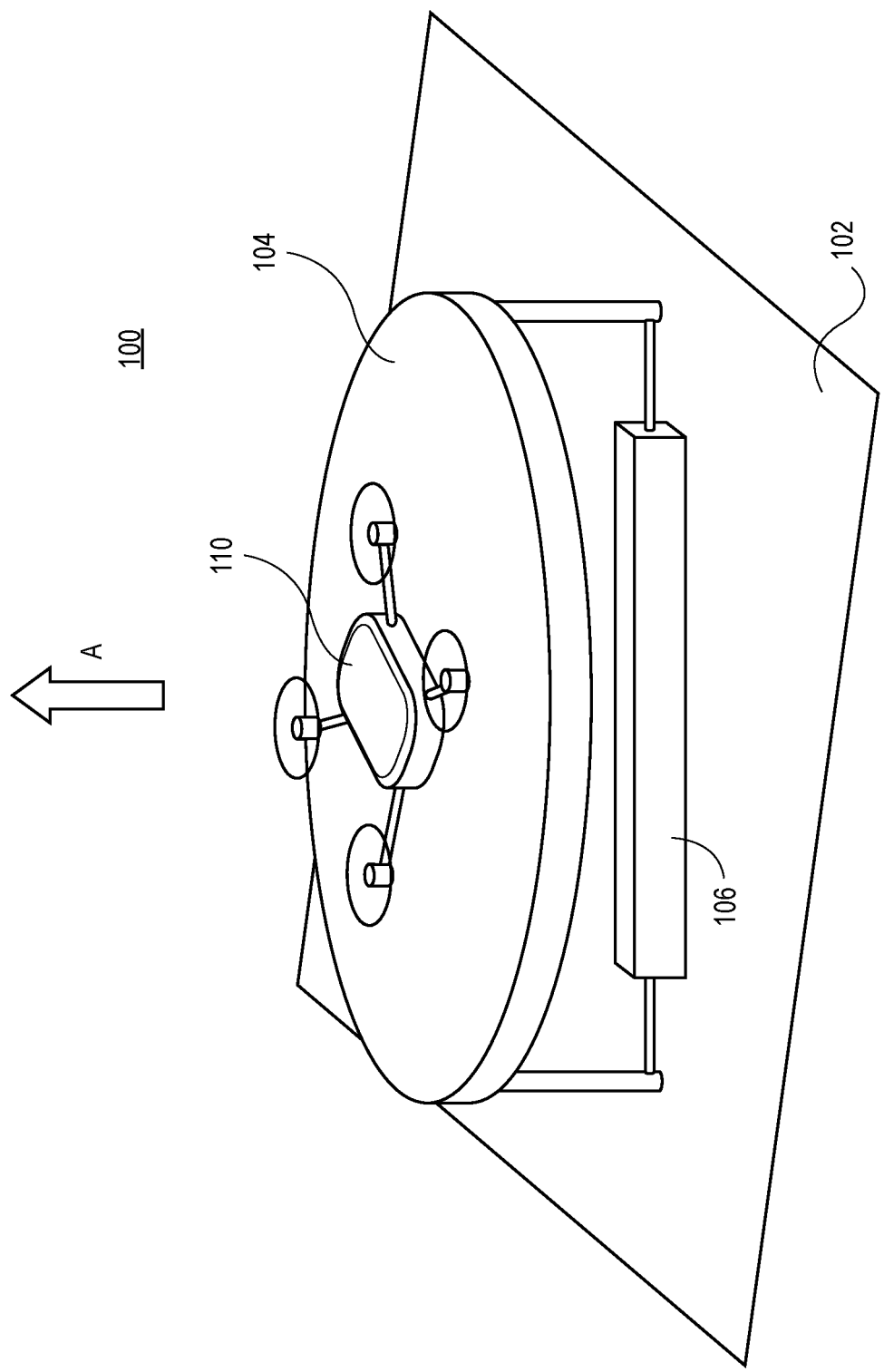
FIGS. 1A through 1E are views of an exemplary adjustable takeoff platform in accordance with embodiments of the present disclosure.

As is set forth in greater detail below, embodiments of the present disclosure are generally directed to an adjustable takeoff platform for aerial vehicles, and preferably, vertical takeoff and landing (VTOL) aerial vehicles, that can reduce the impact that wind can have on an aerial vehicle at takeoff. During takeoff, VTOL aerial vehicles can be blown by the wind, causing the aerial vehicle to drift from its intended flight plan. These effects can be experienced by VTOL aerial vehicles until the VTOL aerial vehicle has had sufficient time to determine the wind conditions and/or any drift the VTOL aerial vehicle has experienced, and adjust its attitude (e.g., yaw; pitch, and/or roll) to counteract the forces of the wind. For example, the wind can cause a VTOL aerial vehicle to drift several meters (e.g., 1 m, 2 m, 3 m, 4 m, 5 m, or more) from its intended flight plan, and it can take several seconds (e.g., 1 s, 2 s, 3 s, 4 s, 5 s, or more) for a VTOL aerial vehicle to adjust its attitude to recover from this drift.

To counteract the effects of wind conditions at takeoff, it may be preferable to adjust a heading, a pitch, and/or a roll of a VTOL aerial vehicle prior to takeoff to reduce the effects that the wind may have on the VTOL aerial vehicle upon takeoff. Embodiments of the present disclosure provide an adjustable takeoff platform that can be rotated and/or angled so as to orient the heading, pitch, and/or roll of a VTOL aerial vehicle in preparation for takeoff to compensate for wind conditions that may affect the VTOL aerial vehicle at takeoff.

As described herein, the adjustable takeoff platform according to embodiments of the present disclosure can include an alignment assembly and an adjustment assembly, which can include a rotation assembly and one or more tilting assemblies. The various assemblies can rotate and/or angle the platform to orient a VTOL aerial vehicle disposed thereon prior to takeoff to reduce the drift that the VTOL aerial vehicle may experience due to wind conditions at takeoff. The alignment assembly can include various features to facilitate positioning of a VTOL aerial vehicle on the adjustable takeoff platform so that the VTOL aerial vehicle is oriented on the adjustable takeoff platform in a known orientation relative to the adjustable takeoff platform prior to takeoff. For example, the alignment assembly can include various components, such as markings, sensors, keyed protrusions and recesses, etc., that may correspond to, mate with, be received by, and/or receive complementary components on the VTOL aerial vehicle to allow the VTOL aerial vehicle to be properly positioned on the adjustable takeoff platform and reduce the possibility of error in preparing the VTOL aerial vehicle for takeoff from the adjustable takeoff platform. The adjustable takeoff platform may include different alignment assemblies for different types of VTOL aerial vehicles that may be used with the adjustable takeoff platform. For example, each type of VTOL aerial vehicle that may be used with the adjustable takeoff platform may have a unique alignment assembly to ensure that the VTOL aerial vehicle is properly positioned on the adjustable takeoff platform. According to certain exemplary embodiments, the adjustable takeoff platform can also include an indicator to show that the VTOL aerial vehicle has been properly positioned on the adjustable takeoff platform.

With a VTOL aerial vehicle properly positioned on the adjustable takeoff platform, the adjustable takeoff platform can receive aircraft information corresponding to the VTOL aerial vehicle preparing for takeoff, as well as weather information at the takeoff location that may be affect a VTOL aerial vehicle at takeoff. According to certain embodiments, the weather information can include a wind direction and magnitude (speed) and the aircraft information can include a database of attitude parameters of the VTOL aerial vehicle for various weather conditions. Optionally, the weather information can further include temperature, relative humidity, barometric pressure, precipitation, visibility, dew point, etc. The aircraft information can specify aerodynamic characteristics of the aircraft, which can include a preferred heading (e.g., nose pointed into the wind), pitch for a given wind magnitude (e.g., 20 degrees pitch for a wind at 10 m/s), and roll (e.g., 0 degrees) for the VTOL aerial vehicle.

Based on the weather information and the aircraft information, the adjustable takeoff platform can be rotated and/or angled, in one or more directions, to orient the VTOL aerial vehicle with an attitude to reduce the effects that the wind may have on the VTOL aerial vehicle at takeoff. For example, a single adjustment assembly can rotate and angle the adjustable takeoff platform in one or more directions, including the VTOL aerial vehicle disposed thereon, to orient the VTOL aerial vehicle with a heading, pitch, and/or roll that can reduce the effects of the wind at takeoff. Alternatively, a rotation assembly can rotate the adjustable takeoff platform, including the VTOL aerial vehicle disposed on the platform, to orient the VTOL aerial vehicle with a heading that can reduce the effects of the wind at takeoff, and one or more tilting assemblies can adjust an angle of the adjustable takeoff platform, including the VTOL aerial vehicle disposed on the platform, in one or more directions, to orient the VTOL aerial vehicle with a pitch and/or roll that can further reduce the effects of the wind at takeoff. According to certain embodiments, the rotation assembly and the one or more tilting assemblies can include various controls, mechanics, motors, servomotors, linkages, hydraulics, pneumatics, etc., to rotate and/or adjust the angle of the adjustable takeoff platform.

Although embodiments of the present disclosure are described primarily with respect to VTOL aerial vehicles, embodiments of the present disclosure can be applicable to other types of aerial vehicles, such as short take-off and vertical landing aircraft (STOVL).

FIG. 1A is perspective view of an exemplary adjustable takeoff platform 100, in accordance with embodiments of the present disclosure, from which aerial vehicle 110 can perform a takeoff in a trajectory shown by arrow A. As shown in FIG. 1A, adjustable takeoff platform 100 can include base or frame 102, movable takeoff pad 104, and one or more adjustment assemblies 106. According to embodiments of the present disclosure, movable takeoff pad 104 is preferably substantially circular, however, other shapes and configurations (e.g., rectangular, triangular, diamond-shaped, oval-shaped, pentagonal, hexagonal, heptagonal, octagonal, etc.) are contemplated. Further, movable takeoff pad 104 can be sized and dimensioned for any type of aerial vehicle. For example, movable takeoff pad can be 1 m, 2 m, 3 m, or more in diameter. Adjustable takeoff platform 100 can be formed of any suitable material, such as plastics, metals (e.g., aluminum, etc.), composites (e.g., graphite, carbon fiber, etc.), or any combination thereof. Although adjustable takeoff platform 100 is shown as a singular structure, it can be one of many takeoff platforms making up an array or assembly of takeoff platforms. Adjustable takeoff platform 100 can also include lights, markings, etc., that are typical of takeoff platforms for VTOL aerial vehicles. According to certain embodiments, adjustable takeoff platform 100 can be a portable structure or a permanent installation. In operation, one or more adjustment assemblies 106 can adjust movable takeoff pad 104 relative to frame 102 so as to orient aerial vehicle 110 with a heading, pitch, and/or roll prior to takeoff. For example, one or more adjustment assemblies 106 can rotate movable takeoff pad 104 relative to frame 102 about an axis of rotation to orient a heading of aerial vehicle 110. Additionally, one or more adjustment assemblies 106 can also vary an angle of movable takeoff pad 104 in one or more directions relative to frame 102 to orient a pitch and/or roll of aerial vehicle 110.

Figure 1B:
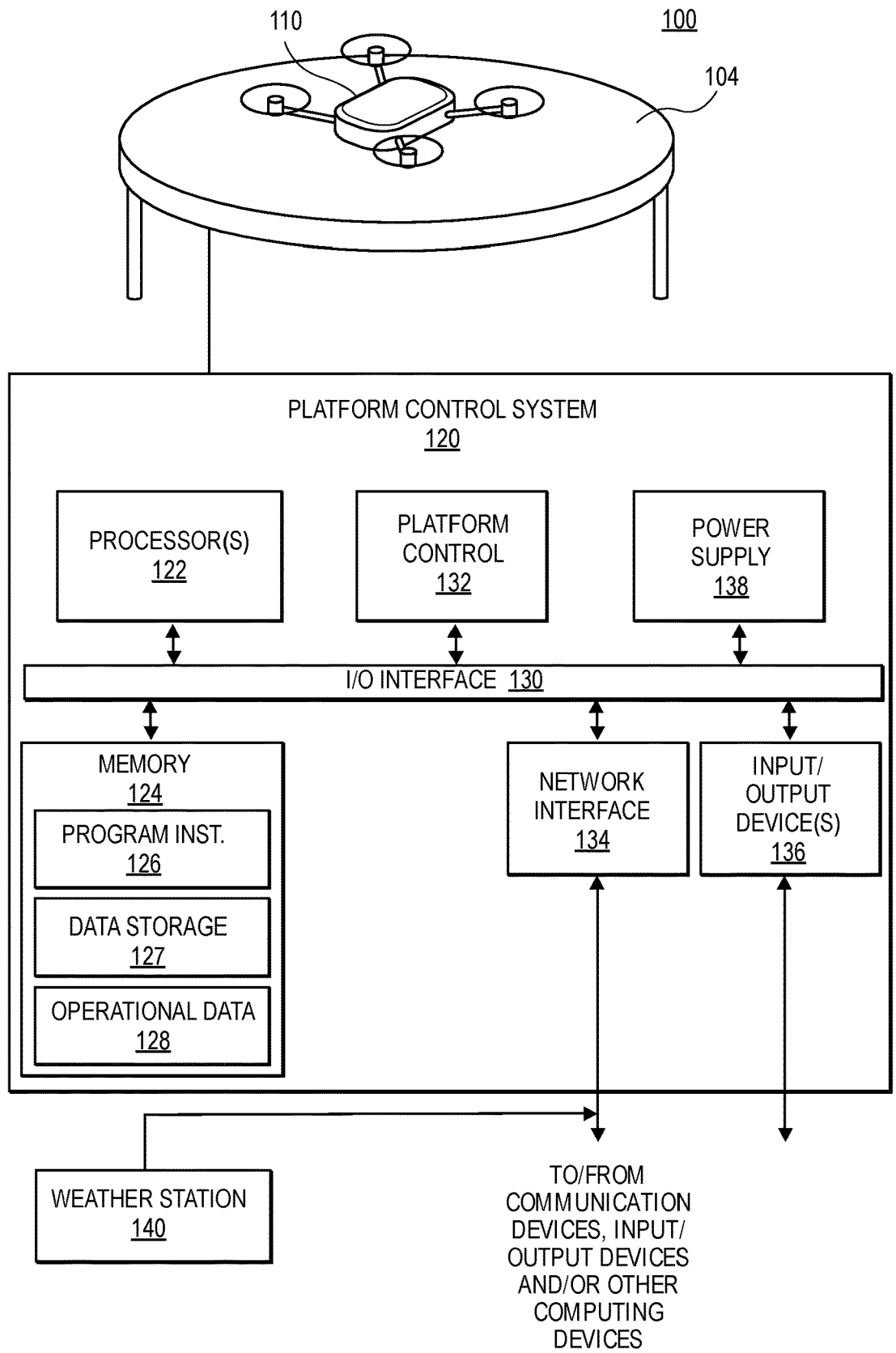

FIG. 1B is a perspective view of an exemplary adjustable takeoff platform 100, in accordance with embodiments of the present disclosure. As shown in FIG. 1B, adjustable takeoff platform 100 can also include platform control system 120. Referring to FIG. 1B, a block diagram of one control system for an adjustable takeoff platform in accordance with embodiments of the present disclosure is shown. In various examples, the block diagram of FIG. 1B may be illustrative of one or more aspects of the platform control system 120 that may be used to implement the various systems and processes discussed herein.

As is shown in FIG. 1B, the platform control system 120 includes one or more processors 122 that are coupled to one or more memory components (e.g., a non-transitory computer-readable medium) 124 via an input/output (I/O) interface 130. The platform control system 120 also includes controller 132, a network interface 134, one or more input/output devices 136 and a power controller or power supply module 138.

The platform control system 120 may be a uniprocessor system including a single processor 122, or a multiprocessor system including several processors 122 (e.g., two, four, eight, or another suitable number of processors). The processors 122 may be any suitable processor capable of executing instructions. For example, in some embodiments, one or more of the processors 122 may be general-purpose or embedded processors implementing any of a variety of instruction set architectures (ISAs), such as the x86, PowerPC, SPARC, or MIPS ISAs, or any other suitable ISA. In multiprocessor systems, one or more of the processors 122 may, but not necessarily, implement the same ISA.

The memory components 124 may be configured to store executable instructions, data, aircraft information, weather information, aircraft heading, pitch, and/or roll parameters for given weather conditions, or any other instructions, data or characteristics associated with operation of an adjustable takeoff platform and takeoff of an aerial vehicle, as well as any other data items accessible by the processor(s) 122. In various embodiments, the memory components 124 may be implemented using any suitable memory technology, such as static random access memory (SRAM), synchronous dynamic RAM (SDRAM), non-volatile or Flash-type memory, or any other type of memory. As is shown in FIG. 1B, program instructions and data implementing desired functions, such as those described above, are shown stored within the memory components 124 as program instructions 126, data storage 127 and operational data 128 relating to aircraft information, weather information, aircraft heading, pitch, and/or roll parameters for given weather conditions, or any other instructions, data or characteristics associated with operation of an adjustable takeoff platform and takeoff of an aerial vehicle, and other operational data, respectively. In other embodiments, program instructions, data and/or operational data may be received, sent or stored upon different types of computer-accessible media, such as non-transitory media, or on similar media separate from the memory components 124 or the platform control system 120. The information or data stored within the memory components 124, e.g., the program instructions 126, the stored data 127 and the operational data 128, may include data related to the operation of servos, worm gears, worm drives, hydraulics, control surfaces or any other aspect of the operation of components of the adjustable takeoff platform described herein.

In some embodiments, the memory components 124 may include storage media or memory media such as magnetic or optical media, e.g., disk or CD/DVD-ROM, coupled to the platform control system 120 via the I/O interface 130. Program instructions and data stored via the memory components 124 may be transmitted by transmission media or signals, such as electrical, electromagnetic, or digital signals, which may be conveyed via a communication medium such as a network and/or a wireless link, such as may be implemented via the network interface 134.

In one implementation, the I/O interface 130 may be configured to coordinate I/O traffic between the processors 122, the memory components 124, and any peripheral devices, the network interface 134 or other peripheral interfaces, such as input/output devices 136. In some implementations, the I/O interface 130 may perform any necessary protocol, timing or other data transformations to convert data signals from one component (e.g., one or more of the memory components 124) into a format suitable for use by another component (e.g., processors 122). In some implementations, the I/O interface 130 may include support for devices attached through various types of peripheral buses, such as a variant of the Peripheral Component Interconnect (PCI) bus standard or the Universal Serial Bus (USB) standard, for example. In some implementations, the functions of the I/O interface 130 may be split into two or more separate components, e.g., a north bridge and a south bridge. Also, in some implementations, some or all of the functionality of the I/O interface 130, such as an interface to the memory components 124, may be incorporated directly into the processors 122.

The platform controls or controllers 132 may communicate with an adjustable takeoff platform, including any adjustment assemblies (e.g., a rotation assembly and/or one or more tilt assemblies), and adjust the movable takeoff pad prior to takeoff in view of prevailing weather conditions. For example, platform control system 120 can send instructions to adjustable takeoff platform 100 to cause adjustment assemblies 106 (e.g., adjustment assembly 106-1, rotation assembly 106-2, and/or one or more of tilt assemblies 106-3 and/or 106-4) to rotate movable takeoff pad 104 about yaw axis 101 and vary an angle of movable takeoff pad 104 in one or more directions relative to horizontal so as to orient a heading, pitch, and/or roll of aerial vehicle 110 about pitch axis 103 and/or roll axis 105, respectively.

The platform control system 120 may further include one or more network interfaces 134 that are configured to allow data to be exchanged between the platform control system 120, other devices attached to a network, such as other computer systems, aerial vehicle control systems of other aerial vehicles, weather station 140, and/or an aerial vehicle management system. For example, the network interface 134 may enable wireless communication between numerous aerial vehicles. In various implementations, the network interface 134 may support communication via wireless general data networks, such as a Wireless Fidelity (or "Wi-Fi") network. The network interface 134 may also support communication via telecommunications networks such as cellular communication networks, satellite networks, and the like.

The platform control system 120 may also include one or more input/output devices 136, e.g., one or more displays, image capture devices, imaging devices, thermal sensors, infrared sensors, accelerometers, pressure sensors, weather sensors, or the like.

As is shown in FIG. 1B, the memory components 124 may include program instructions 126 which may be configured to implement the example processes and/or sub-processes described above. The data storage 127 and operational data 128 may include various data stores for maintaining data items that may be provided for controlling the actuation of the various propeller blade pitch adjustment apparatuses described herein to adjust pitches of propeller blades.

Figure 1C:
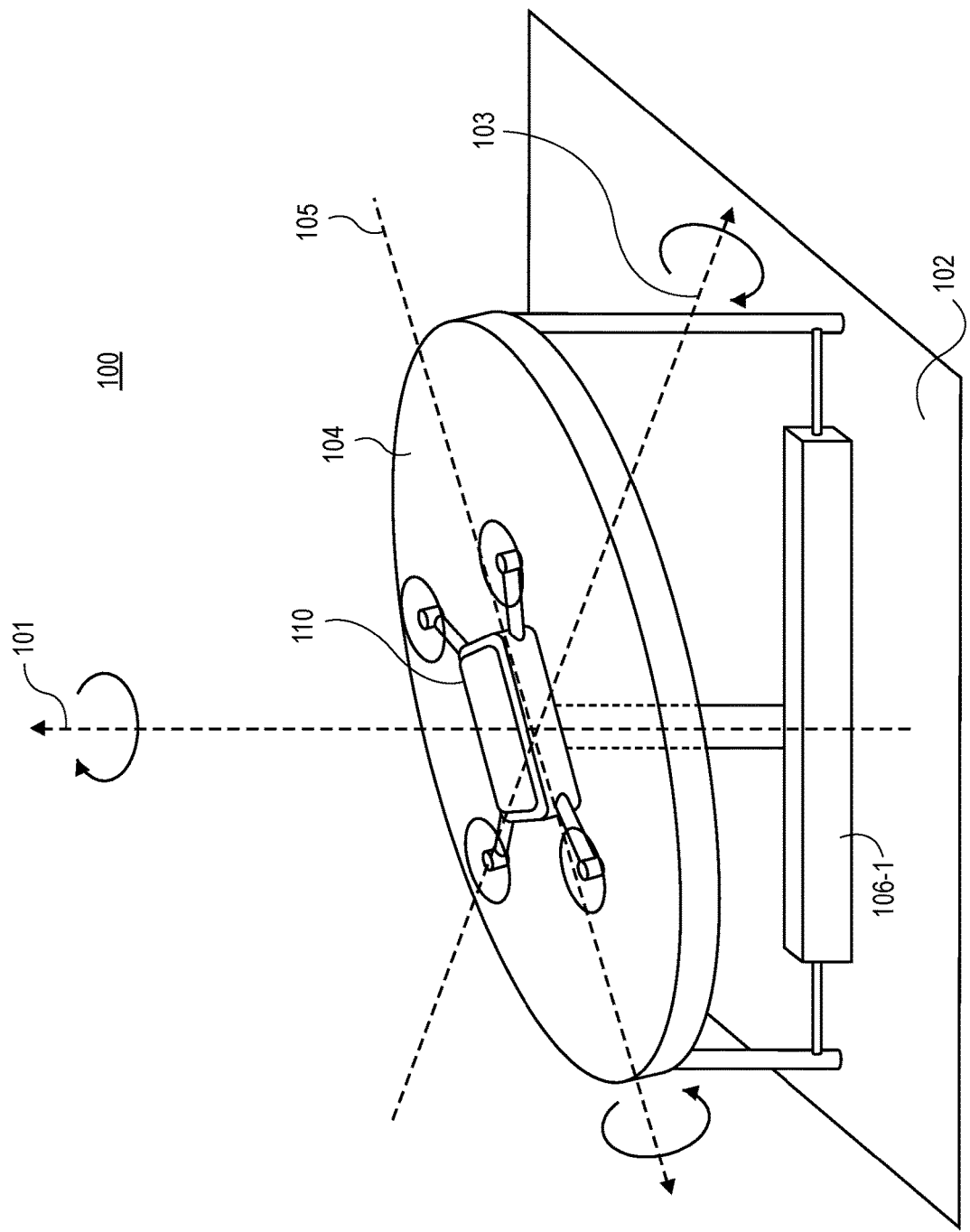
Figure 1D:
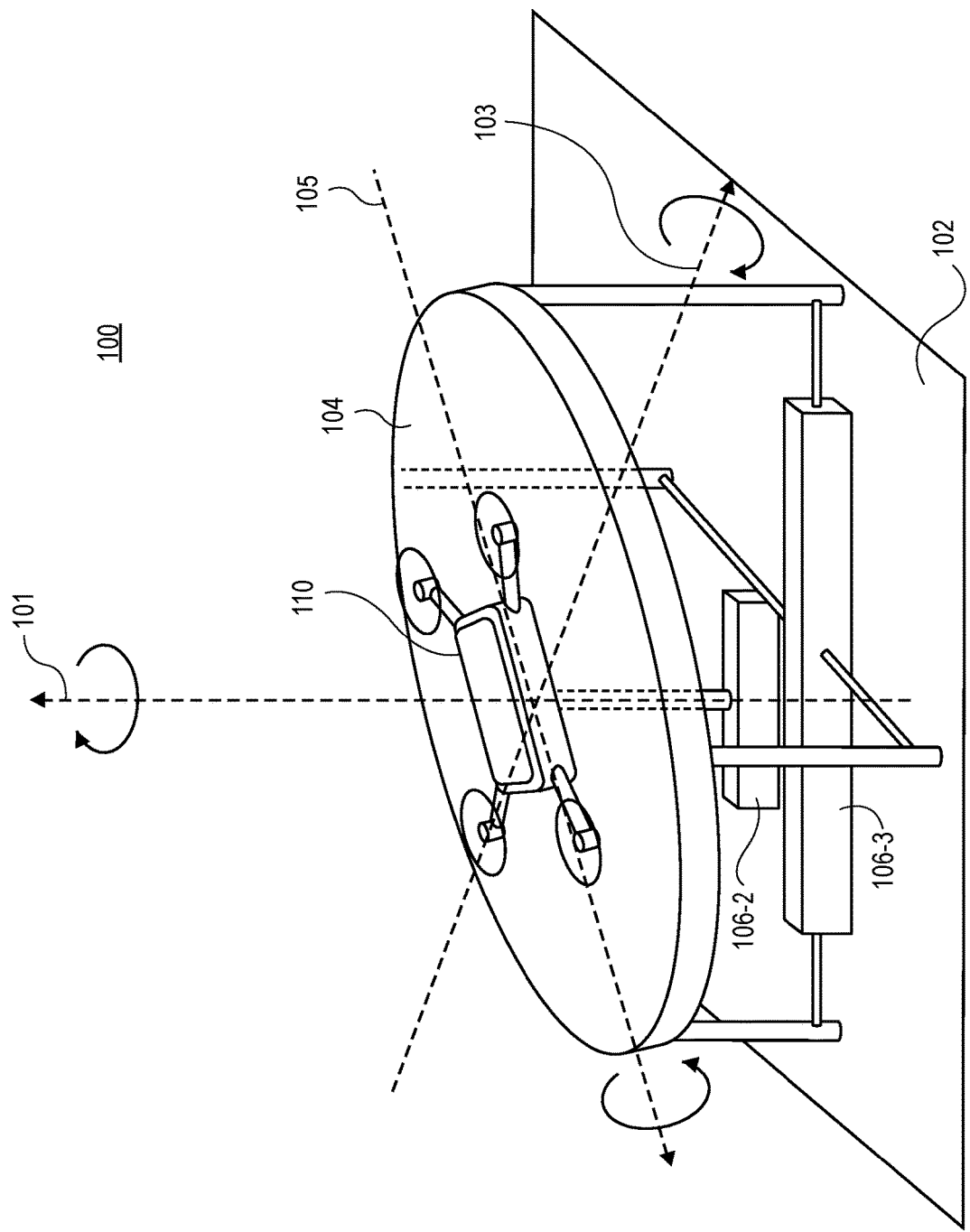
Figure 1E:
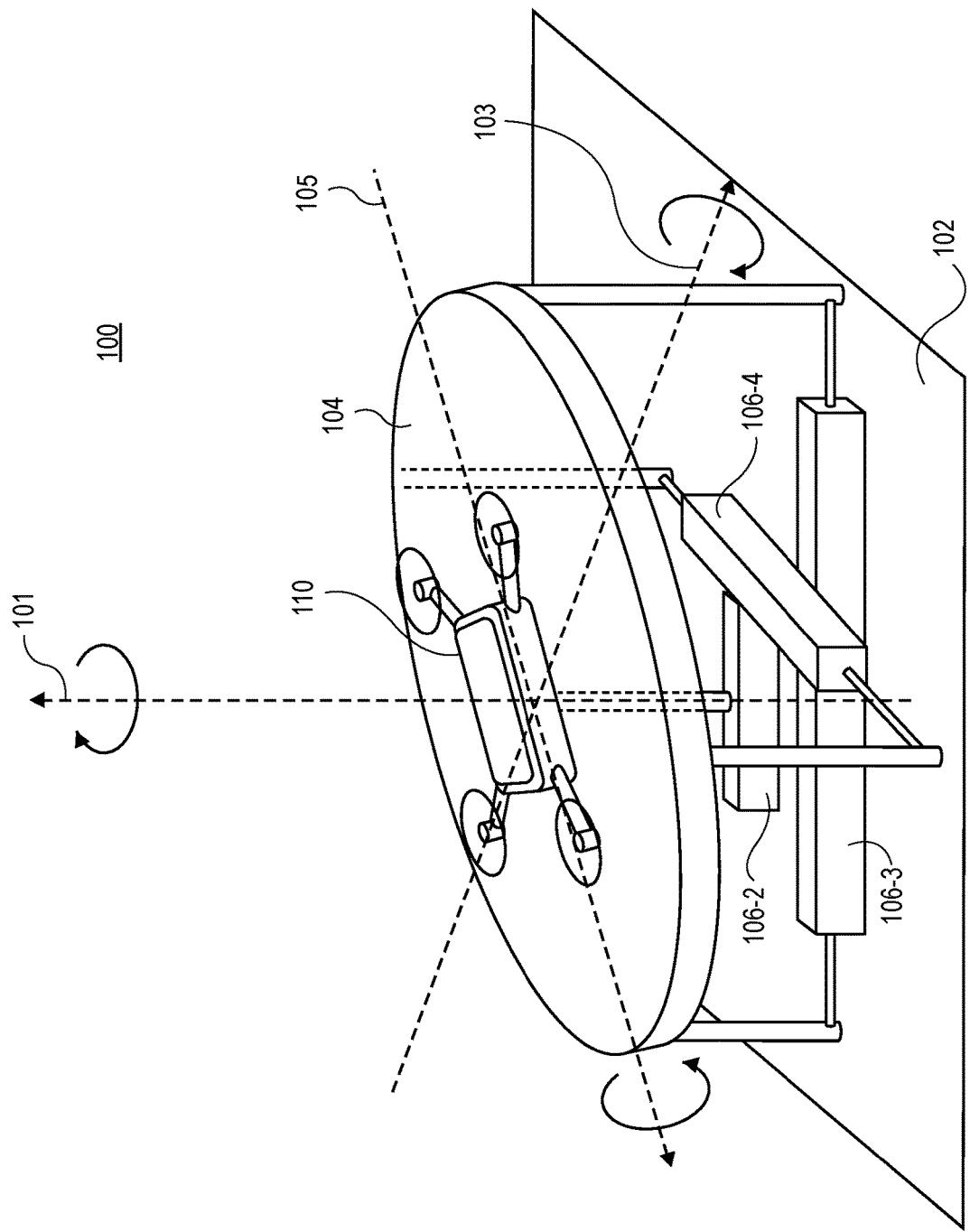

FIG. 1C is perspective view of adjustable takeoff platform 100, in accordance with embodiments of the present disclosure. As shown in FIG. 1C, adjustable takeoff platform 100 includes a single adjustment assembly 106-1. According to certain embodiments, a single adjustment assembly 106-1 can adjust movable takeoff pad 104 in multiple degrees of freedom (e.g., 360-degree rotation about yaw axis 101, an angle of movable takeoff pad 104 in one or more directions relative to horizontal, such as, about pitch axis 103 and roll axis 105) to orient aerial vehicle 110 in preparation for takeoff. For example, adjustment assembly 106-1 can rotate movable takeoff pad 104 about yaw axis 101 and can vary an angle of movable takeoff pad 104 in one or more directions relative to horizontal to orient a heading, pitch, and/or roll of aerial vehicle 110 about yaw axis 101, pitch axis 103 and/or roll axis 105, respectively. Alternatively, as shown in FIG. 1D, adjustable takeoff platform 100 can include rotation assembly 106-2, which can rotate movable takeoff pad 104 about yaw axis 101, and a single tilting assembly 106-3, which can vary an angle of movable takeoff pad 104 in one or more directions relative to horizontal. Accordingly, rotation assembly 106-2 can orient a heading of aerial vehicle 110 and tilt assembly 106-3 can orient a pitch and/or roll of aerial vehicle 110. According to yet another embodiment and, as shown in FIG. 1E, adjustable takeoff platform 100 can include rotation assembly 106-2, which can rotate movable takeoff pad 104 about yaw axis 101, tilt assembly 106-3, which can vary an angle of movable takeoff pad 104 in a first direction relative to horizontal, and tilt assembly 106-4, which can vary an angle of movable takeoff pad 104 in a second direction relative to horizontal. Thus, rotation assembly 106-2 can orient a heading of aerial vehicle 110, tilt assembly 106-3 can orient a pitch of aerial vehicle 110, and tilt assembly 106-4 can orient a roll of aerial vehicle 110. According to further embodiments, adjustable takeoff platform 100 can include any number of adjustment assemblies 106 to facilitate adjustment of movable takeoff pad 104 in any direction.

According to embodiments of the present disclosure, each of adjustment assembly 106, adjustment assembly 106-1, rotation assembly 106-2, tilting assembly 106-3, and/or tilting assembly 106-4 can include motors (e.g., servomotor, stepper motor, etc.), actuators (e.g., linear, rotary, etc.), pneumatics, worm screw arrangement, hydraulics, linkages, gears, belts, or various other configurations or arrangements to cause the adjustment of movable takeoff pad 104 relative to frame 102. For example, one or more of adjustment assembly 106, adjustment assembly 106-1, rotation assembly 106-2, tilting assembly 106-3, and/or tilting assembly 106-4 can receive an instruction or command to adjust movable takeoff pad 104 in view of certain weather conditions to orient a heading, pitch, and/or roll of aerial vehicle 110 to counteract the prevailing weather conditions. According to one embodiment, adjustment assembly 106-1 can adjust movable takeoff pad 104 in multiple directions to orient a heading, pitch, and/or roll of aerial vehicle 110. According to another embodiment, rotation assembly 106-2 can rotate movable takeoff pad 104 to adjust a heading of aerial vehicle 110, and one or more of tilting assemblies 106-3 and/or 106-4 can vary an angle of movable takeoff pad 104, in one or more directions, to orient a pitch and/or roll of aerial vehicle 110. Further, each of adjustment assembly 106, adjustment assembly 106-1, rotation assembly 106-2, tilting assembly 106-3, and/or tilting assembly 106-4 can include stops or other mechanisms (e.g., locking pins, etc.) to releasably secure movable takeoff pad 104 in the desired takeoff position relative to frame 102.

FIGS. 2A, 2B, 3A, 3B, 4A, and 4B show certain adjustments of adjustable takeoff platform 100 according to embodiments of the present disclosure. Except where otherwise noted, reference numerals preceded by the number "2," "3", or "4" shown in FIGS. 2A, 2B, 3A, 3B, 4A, and 4B, respectively, indicate components or features that are similar to components or features having reference numerals preceded by the number "1" in FIGS. 1A, 1B, 1C, 1D, and 1E.

Figure 2A:
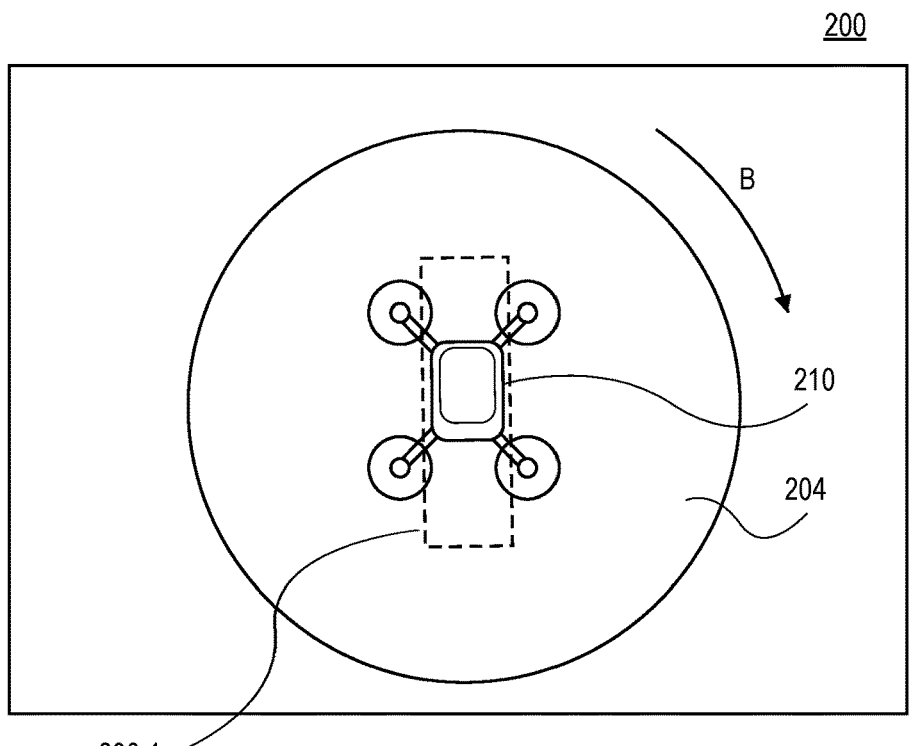
FIGS. 2A and 2B are views of aspects of an exemplary adjustable takeoff platform in accordance with embodiments of the present disclosure.
Figure 2B:
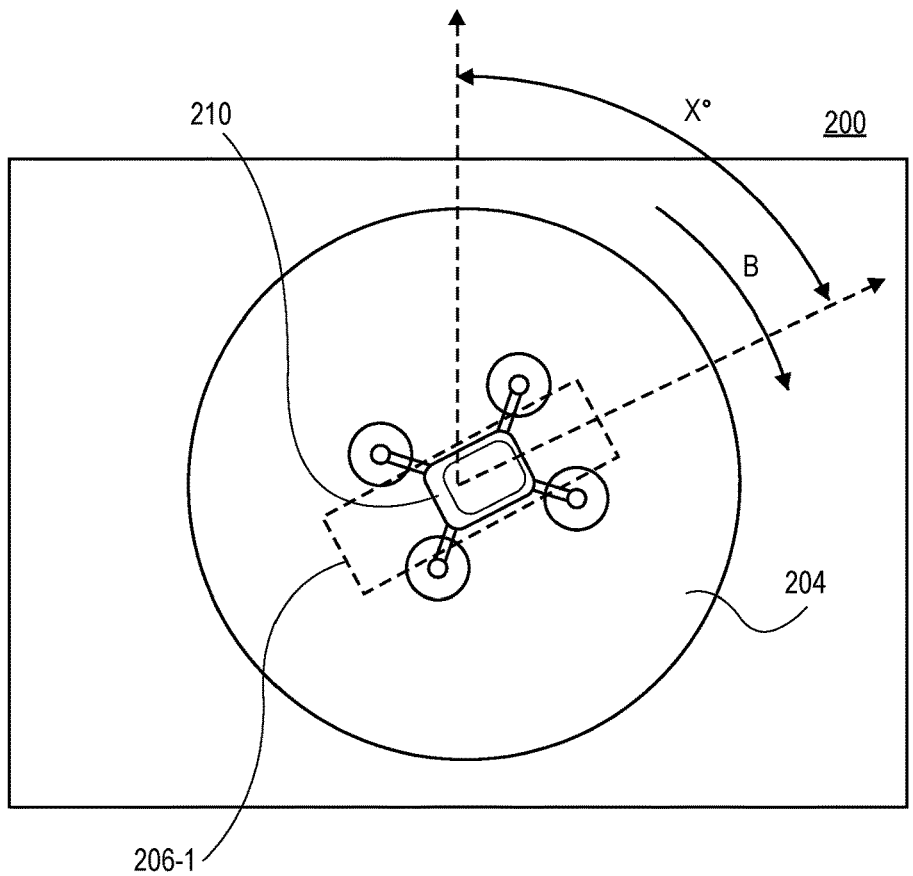

FIGS. 2A and 2B show top-down views of a rotation of movable takeoff pad 204 from a preliminary position to a takeoff position to, for example, orient a heading of aerial vehicle 210 in view of wind conditions in preparation for takeoff. As shown in FIGS. 2A and 2B, movable takeoff pad 204 has been rotated X degrees in a clockwise direction B. In embodiments where adjustable takeoff platform 200 includes a single adjustment assembly 206-1, the rotation may have been caused by adjustment assembly 206-1. In other embodiments where adjustable takeoff platform 200 may include a rotation assembly (e.g., such as rotation assembly 106-2) and one or more tilting assemblies (e.g., such as tilting assemblies 106-3 and/or 106-4), the rotation may have been caused by the rotation assembly (e.g., such as rotation assembly 106-2). For example, platform control system 120 can send an instruction to adjustment assembly 206-1 (or a rotation assembly) to cause rotation of movable takeoff pad 204. The instruction sent to cause rotation of movable takeoff pad 204 can specify, for example, current weather conditions, an angle of rotation, a direction of rotation, a heading for aerial vehicle 210, aerodynamic characteristics of aerial vehicle 210, mass properties of aerial vehicle 210 (e.g., mass, moment of inertia, location of center of gravity, etc.), a time at which to perform the rotation, etc. Upon receipt of the instruction to rotate movable takeoff pad 204, adjustment assembly 206-1 (or a rotation assembly) can rotate movable takeoff pad 204 in accordance with the received instructions. Although FIGS. 2A and 2B show movable takeoff pad 204 being rotated in a clockwise direction, movable takeoff pad 204 can also be rotated in a counter-clockwise direction, and movable takeoff pad 204 may have the capability to be rotated in both clockwise and counter-clockwise directions. In order to orient the heading of aerial vehicle 210 to any desired orientation, movable takeoff pad 204 can be rotated 360 degrees about its axis of rotation.

Figure 3A:
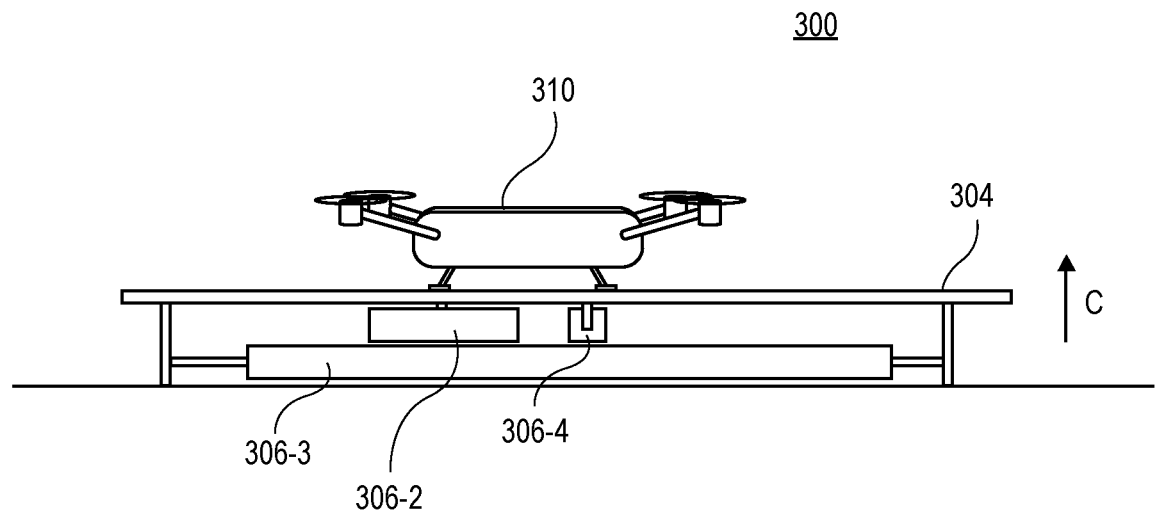
FIGS. 3A and 3B are views of aspects of an exemplary adjustable takeoff platform in accordance with embodiments of the present disclosure.
Figure 3B:
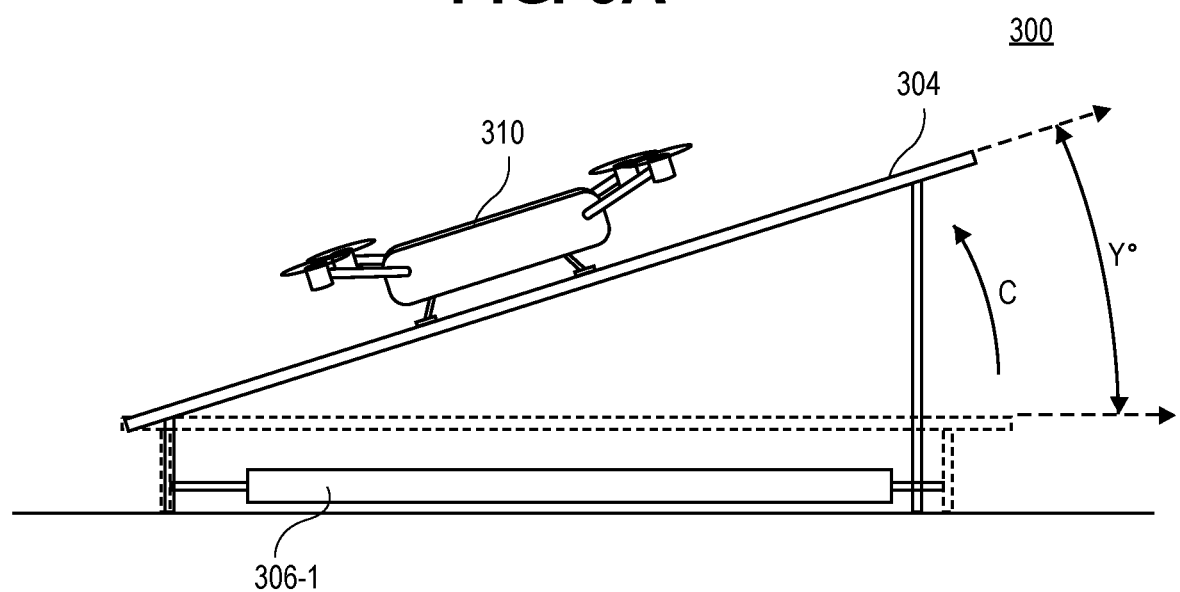

FIGS. 3A and 3B show side views of an angular adjustment of movable takeoff pad 304 in one direction relative to horizontal from a preliminary position to a takeoff position to, for example, orient a pitch or a roll of aerial vehicle 310 in view of wind conditions in preparation for takeoff. As shown in FIGS. 3A and 3B, an angle of movable takeoff pad 304 relative to horizontal has been adjusted by Y degrees in direction C. In embodiments where adjustable takeoff platform 300 includes a single adjustment assembly 306-1, the angular adjustment may have been caused by adjustment assembly 306-1. In other embodiments where adjustable takeoff platform 300 may include rotation assembly 306-2 and one or more tilting assemblies 306-3 and/or 306-4, the angular adjustment may have been caused by one or more tilting assemblies 306-3 and/or 306-4. For example, platform control system 120 can send an instruction to adjustment assembly 306-1 (or tilting assemblies 306-3 and/or 306-4) to cause an angular adjustment of movable takeoff pad 304. The instruction sent to cause the adjustment of the angle of movable takeoff pad 304 can specify, for example, current weather conditions, an angle of adjustment, a direction of angular adjustment, a takeoff, a pitch and/or roll for aerial vehicle 310, aerodynamic characteristics of aerial vehicle 310, mass properties of aerial vehicle 310 (e.g., mass, moment of inertia, location of center of gravity, etc.), a time at which to perform the adjustment, etc. Upon receipt of the instruction to adjust the angle of movable takeoff pad 304, adjustment assembly 306-1 (or tilting assemblies 306-3 and/or 306-4) can adjust the angle of movable takeoff pad 304 in accordance with the received instructions. According to embodiments of the present disclosure, movable takeoff pad 304 can be angled 5° relative to horizontal, 10° relative to horizontal, 15° relative to horizontal, 20° relative to horizontal, 30° relative to horizontal, 45° relative to horizontal, or more, or any angle therebetween.

Figure 4A:
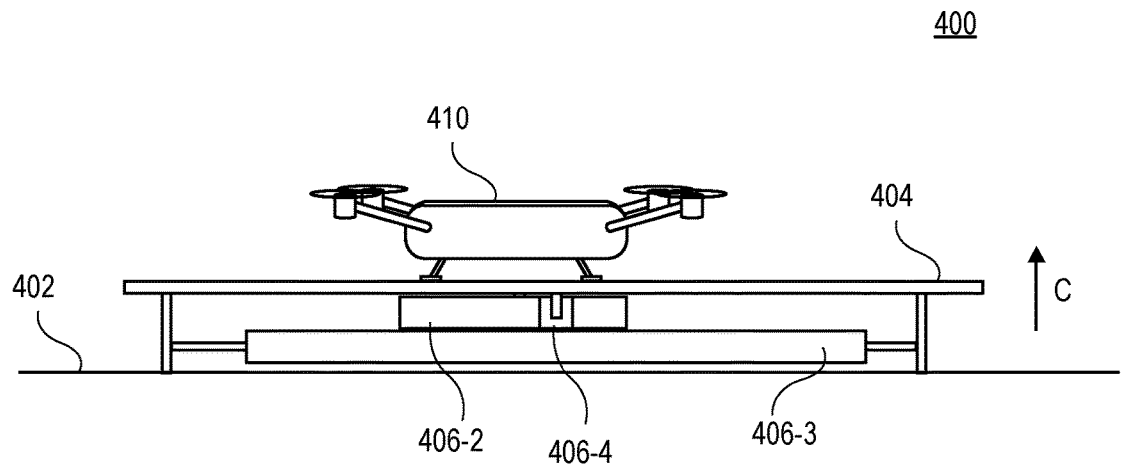
FIGS. 4A and 4B are views of aspects of an exemplary adjustable takeoff platform in accordance with embodiments of the present disclosure.
Figure 4B:
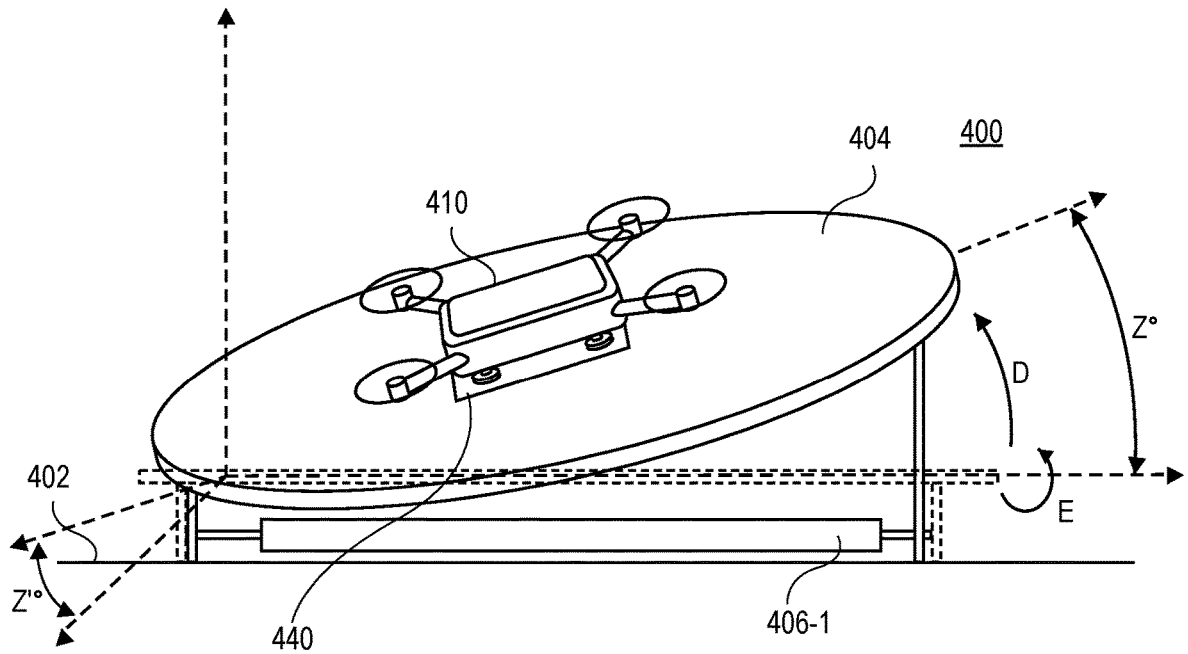

FIGS. 4A and 4B show side views of an angular adjustment of movable takeoff pad 404 in more than one direction relative to horizontal from a preliminary position to a takeoff position to, for example, orient a pitch and a roll of aerial vehicle 410 in view of wind conditions in preparation for takeoff. As shown in FIGS. 4A and 4B, an angle of movable takeoff pad 404 relative to horizontal has been adjusted by Z degrees in direction D and Z' degrees in direction E. In embodiments where adjustable takeoff platform 400 includes a single adjustment assembly 406-1, the angular adjustment may have been caused by adjustment assembly 406-1. In other embodiments where adjustable takeoff platform 400 may include rotation assembly 406-2 and one or more tilting assemblies 406-3 and/or 406-4, the angular adjustment may have been caused by one or more tilting assemblies 406-3 and/or 406-4. For example, platform control system 120 can send an instruction to adjustment assembly 406-1 (or tilting assemblies 406-3 and/or 406-4) to cause an angular adjustment of movable takeoff pad 404. The instruction sent to cause the adjustment of the angle of movable takeoff pad 404 can specify, for example, current weather conditions, an angle of adjustment, a direction of angular adjustment, a pitch and/or roll for aerial vehicle 410, aerodynamic characteristics of aerial vehicle 410, mass properties of aerial vehicle 410 (e.g., mass, moment of inertia, location of center of gravity, etc.), a time at which to perform the adjustment, etc. Upon receipt of the instruction to adjust the angle of movable takeoff pad 404, adjustment assembly 406-1 (or tilting assemblies 406-3 and/or 406-4) can adjust the angle of movable takeoff pad 404 in accordance with the received instructions. According to embodiments of the present disclosure, movable takeoff pad 404 can be angled in more than one direction (e.g., direction D and direction E) at various angles relative to horizontal (e.g., 5° relative to horizontal, 10° relative to horizontal, 15° relative to horizontal, 20° relative to horizontal, 30° relative to horizontal, 45° relative to horizontal, or more, or any angle therebetween) to adjust a pitch and/or roll of aerial vehicle 410 for various wind conditions.

Optionally, adjustable takeoff platform 400 can include securing assembly 440 to secure aerial vehicle 410 to movable takeoff pad 404 prior to takeoff. Securing assembly 440 can include a high-friction material that contacts aerial vehicle 410 and introduces a frictional force to prevent movement of aerial vehicle 410 regardless of the angular adjustments of movable takeoff pad 404. Alternatively, securing assembly 440 can include a releasably locking mechanism (e.g., a press-fit connection, a robotic arm, etc.) that holds aerial vehicle 410 in place until takeoff.

FIGS. 5A, 5B, 6A, 6B, and 6C show certain adjustments of adjustable takeoff platform 100 according to embodiments of the present disclosure in view of certain wind conditions. Except where otherwise noted, reference numerals preceded by the number "5" or "6" shown in FIGS. 5A, 5B, 6A, and 6B, respectively, indicate components or features that are similar to components or features having reference numerals preceded by the number "1" in FIGS. 1A, 1B, 1C, 1D, and 1E.

Figure 5A:
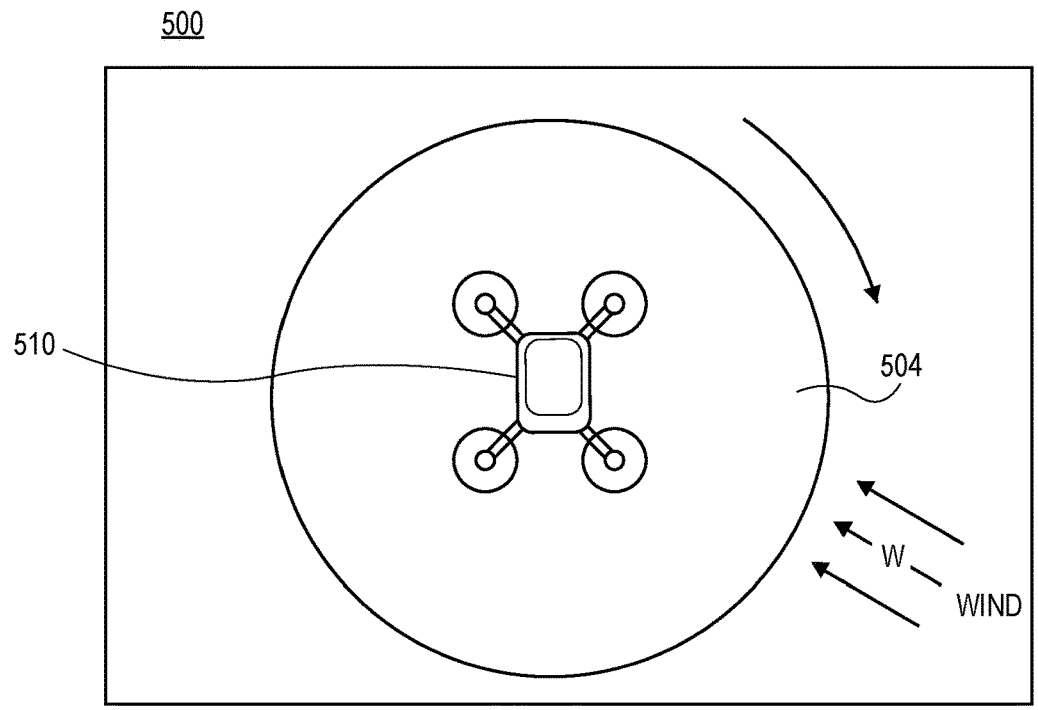
FIGS. 5A and 5B are views of aspects of an exemplary adjustable takeoff platform in accordance with embodiments of the present disclosure.
Figure 5B:
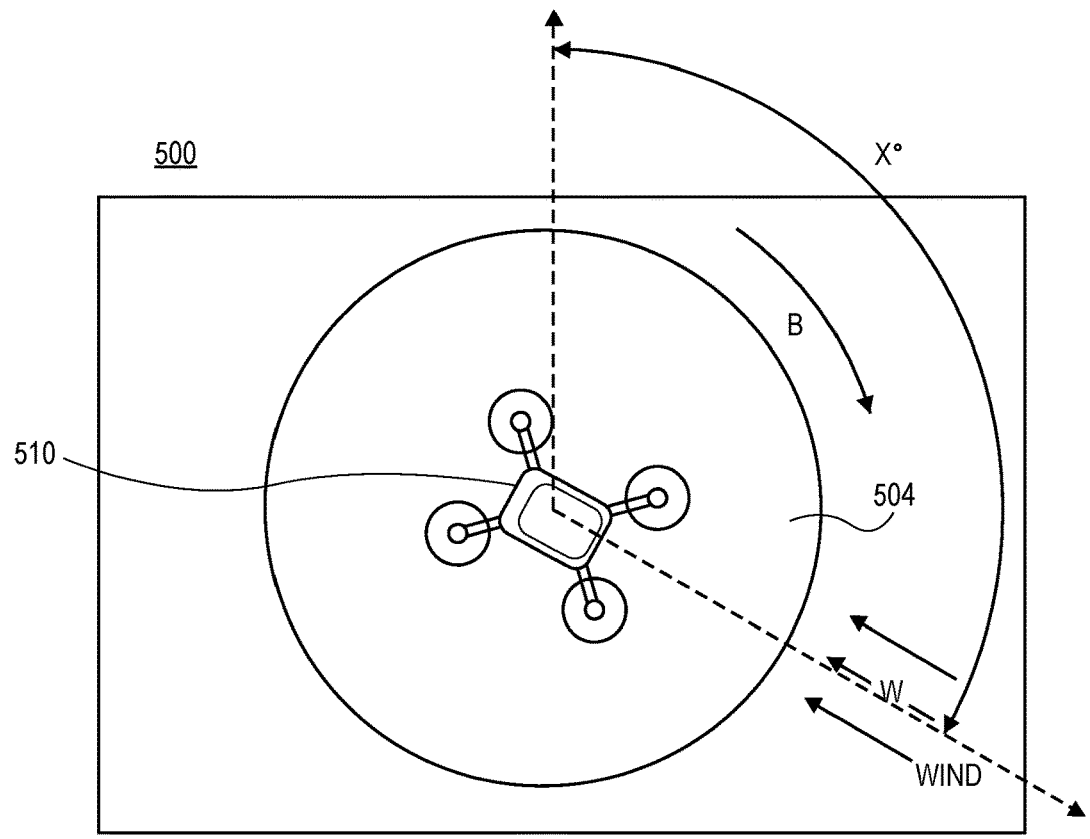

FIGS. 5A and 5B show top-down views of a rotation of movable takeoff pad 504 to orient a heading of aerial vehicle 510 in preparation for takeoff in view of wind conditions shown by arrows W, which indicate the direction of the wind. As shown in FIGS. 5A and 5B, movable takeoff pad 504 has been rotated X degrees in a clockwise direction B. For example, it may be preferable to orient a heading of aerial vehicle 510 into the wind in preparation for takeoff. Accordingly, if the wind were blowing from the southeast, it may be preferable to orient aerial vehicle 510 to have a southeast heading facing the direction of the wind. Similarly, if the wind were blowing from the north-northwest, it may be preferable to orient aerial vehicle 510 to have a north-northwest heading facing the direction of the wind. The preferred heading for aerial vehicle 510 may depend on the aerodynamic characteristics of aerial vehicle 510 and may be different for each type of aerial vehicle. For example, based on the aerodynamic characteristics of the aerial vehicle, it may be preferable for an aerial vehicle to be oriented at an angle of 30° relative to the direction of the wind, 45° relative to the direction of the wind, 60° relative to the direction of the wind, 90° relative to the direction of the wind, or at any other angle relative to the wind that may be dictated by the aerodynamic characteristics of the aerial vehicle. Thus, movable takeoff pad 504 can be rotated 360 degrees to orient aerial vehicle 510 in any direction from which the wind may be blowing. In embodiments where adjustable takeoff platform 500 includes a single adjustment assembly (e.g., such as adjustment assembly 106-1), the rotation may have been caused by the adjustment assembly (e.g., such as adjustment assembly 106-1). In other embodiments where adjustable takeoff platform 500 may include a rotation assembly (e.g., such as rotation assembly 106-2) and one or more tilting assemblies (e.g., such as tilting assemblies 106-3 and/or 106-4), the rotation may have been caused by the rotation assembly (e.g., such as rotation assembly 106-2). For example, platform control system 120 can send an instruction to the adjustment assembly (or rotation assembly) to cause rotation of movable takeoff pad 504. The instruction sent to cause rotation of movable takeoff pad 504 can specify, for example, current weather conditions, an angle of rotation, a direction of rotation, a heading for aerial vehicle 510, aerodynamic characteristics of aerial vehicle 510, mass properties of aerial vehicle 510 (e.g., mass, moment of inertia, location of center of gravity, etc.), a time at which to perform the rotation, etc. Upon receipt of the instruction to rotate movable takeoff pad 504, the adjustment assembly (or rotation assembly) can rotate movable takeoff pad 504 in accordance with the received instructions. Although FIGS. 5A and 5B show movable takeoff pad 504 being rotated in a clockwise direction, movable takeoff pad 504 can also be rotated in a counter-clockwise direction, and movable takeoff pad 504 may have the capability to be rotated in both clockwise and counter-clockwise directions. In order to orient the heading of aerial vehicle 510 to accommodate any wind condition, movable takeoff pad 504 can be rotated 360 degrees about its axis of rotation for any wind condition that may be encountered.

Figure 6A:
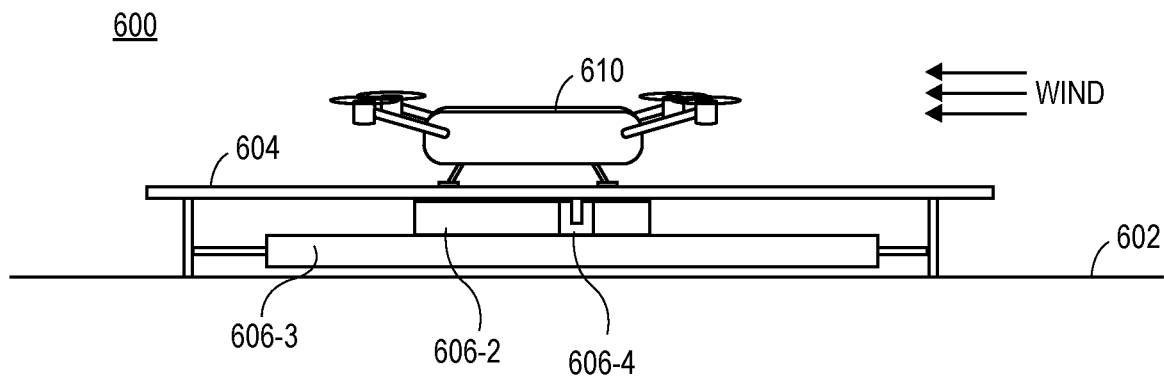
FIGS. 6A through 6C are views of aspects of an exemplary adjustable takeoff platform in accordance with embodiments of the present disclosure.
Figure 6B:
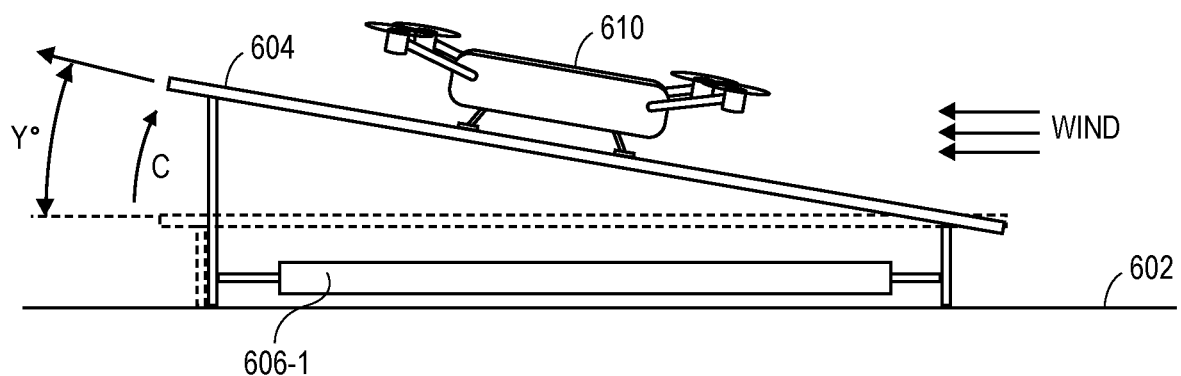
Figure 6C:
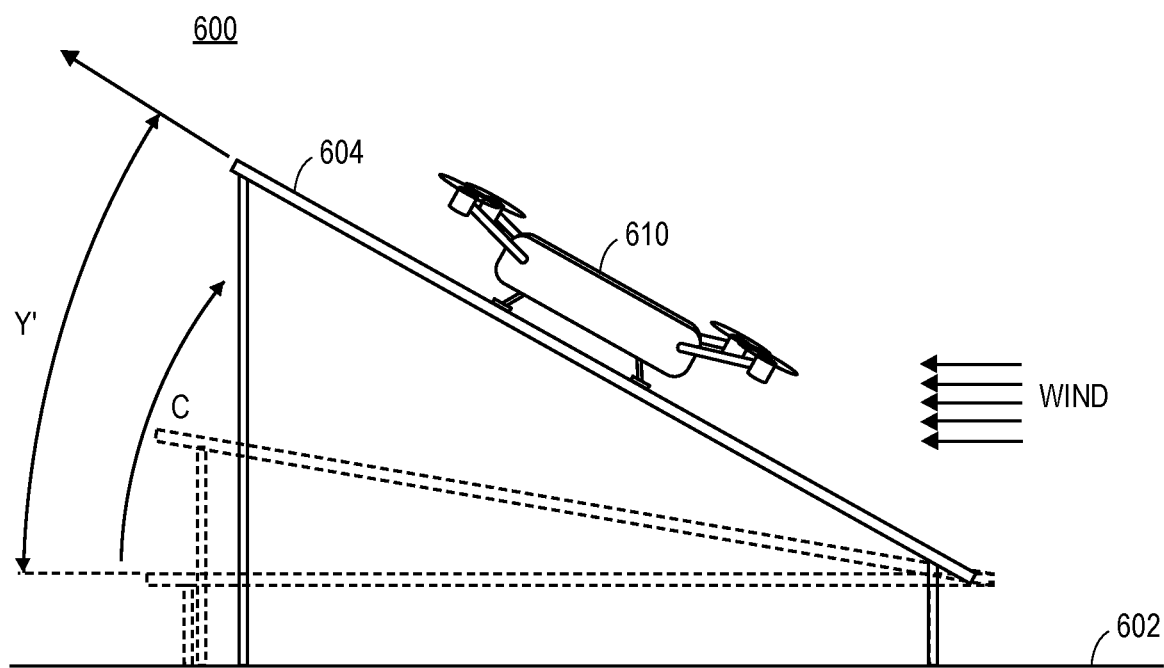

FIGS. 6A, 6B, and 6C show side views of angular adjustments of movable takeoff pad 604 in one direction relative to horizontal from a preliminary position to different takeoff positions to, for example, orient a pitch or a roll of aerial vehicle 610 in view of wind conditions in preparation for takeoff. As shown in FIGS. 6A and 6B, an angle of movable takeoff pad 604 relative to horizontal has been adjusted by Y degrees in direction C in view of the wind conditions shown in FIG. 6B prior to takeoff. In FIG. 6C, angle of movable takeoff pad 604 relative to horizontal has been adjusted by Y' degrees in direction C in view of the wind conditions shown in FIG. 6C, which may be different than the wind conditions shown in FIG. 6B. As shown in FIG. 6A-FIG. 6C, movable takeoff pad 604 has been adjusted to have a greater angle relative to frame 602 in the configuration shown in FIG. 6C when compared to the configuration shown in FIG. 6B. For example, it may be preferable to pitch (and/or roll) aerial vehicle 610 at a certain angular orientation in view of the magnitude (speed) of the wind at takeoff. For example, platform control system 120 can send an instruction to adjustment assembly 606-1 (or tilting assemblies 606-3 and/or 606-4) to cause an angular adjustment of movable takeoff pad 604. The instruction sent to cause the adjustment of the angle of movable takeoff pad 604 can specify, for example, current weather conditions, an angle of adjustment, a direction of angular adjustment, a pitch and/or roll for aerial vehicle 610, aerodynamic characteristics of aerial vehicle 610, mass properties of aerial vehicle 610 (e.g., mass, moment of inertia, location of center of gravity, etc.), a time at which to perform the adjustment, etc. Upon receipt of the instruction to adjust the angle of movable takeoff pad 604, adjustment assembly 606-1 (or tilting assemblies 606-3 and/or 606-4) can adjust the angle of movable takeoff pad 604 in accordance with the received instructions. Accordingly, based on the aerodynamic characteristics of aerial vehicles, each type of aerial vehicle may have a pitch and/or roll for a given wind speed. For example, for a wind blowing at 10 m/s, it may be preferable to pitch aerial vehicle 610 approximately 20°. Similarly, for a wind with a magnitude of 2 m/s, it may be preferable to pitch aerial vehicle approximately 6°. According to embodiments of the present disclosure, movable takeoff pad 604 can be angled in more than one direction at various angles relative to horizontal (e.g., 5° relative to horizontal, 10° relative to horizontal, 15° relative to horizontal, 20° relative to horizontal, 30° relative to horizontal, 45° relative to horizontal, or more, or any angle therebetween) to orient a pitch and/or roll of aerial vehicle 610 for any given wind speed.

FIGS. 7A, 7B, 7C, 7D, and 7E show certain alignment assemblies 730 of adjustable takeoff platform 100 according to embodiments of the present disclosure. Except where otherwise noted, reference numerals preceded by the number "7" shown in FIGS. 7A, 7B, and 7CB indicate components or features that are similar to components or features having reference numerals preceded by the number "1" in FIGS. 1A, 1B, 1C, 1D, and 1E.

As shown in FIGS. 7A, 7B, 7C, 7D, and 7E adjustable takeoff platform 700 can include one or more alignment assemblies 730-1, 730-2, and/or 730-3 to facilitate positioning of aerial vehicle 710 on adjustable takeoff platform 700 in a known orientation relative to movable takeoff pad 704 to reduce errors in adjusting movable takeoff pad 704 to position aerial vehicle 710 in view of the wind conditions at takeoff. Specifically, the orientation of aerial vehicle 710 should be known prior to adjusting movable takeoff pad 704 to properly position aerial vehicle 710 in view of the wind conditions at takeoff. Accordingly, alignment assemblies 730-1, 730-2, and/or 730-3 can allow aerial vehicle 710 to be positioned on movable takeoff pad 704 in a known orientation. Alignment assemblies 730-1, 730-2, and/or 730-3 can include various components to facilitate such positioning. For example, alignment assemblies 730-1 can include visual markings that align with markings or components (e.g., landing gears) of aerial vehicle 710. Alternatively, or in addition, alignment assembly 730 can include keyed protrusion 730-3 and recess 730-2 that can only be mated in a single relative orientation. For example, one of adjustable takeoff platform 700 and aerial vehicle 710 can include a protrusion having an asymmetrical shape/design/cross-section that is configured to mate and be received by a complementary recess disposed on the other of adjustable takeoff platform 700 and aerial vehicle 710. Alternatively or in addition, alignment assemblies 730-1, 730-2, and/or 730-3 can include optical, electrical, electromechanical, electromagnetic sensors (e.g., Hall sensor, inductive sensor, capacitive sensor, photoelectric sensor, radar, lidar, ultrasonic, laser ranging, etc.) that can detect proximity of certain components of aerial vehicle 710 to ensure proper alignment of aerial vehicle 710 on movable takeoff pad 704. According to certain exemplary embodiments, alignment assembly can include securing assembly 740 to prevent movement of aerial vehicle 710 prior to takeoff. As described herein, securing assembly 740 can include a high-friction material that contacts aerial vehicle 710 and introduces a frictional force to prevent movement of aerial vehicle 710 regardless of the angular adjustments of movable takeoff pad 704. Alternatively, securing assembly 740 can include a releasably locking mechanism (e.g., a press-fit connection, a robotic arm, etc.) that holds aerial vehicle 710 in place until takeoff.

Since different types of aerial vehicles may have different designs, components, configurations, etc., each type of aerial vehicle may require a unique alignment assembly 730. For example, different types of aerial vehicles may include differently configured landing gear. Accordingly, alignment assembly 730 may be unique for every different landing gear configuration. According to certain embodiments, adjustable takeoff platform 700 can include an interchangeable alignment assembly 730, which can be releasably secured to adjustable takeoff platform 700 depending on the type of aerial vehicle being used with adjustable takeoff platform 700. For example, each type of aerial vehicle that can be used with adjustable takeoff platform 700 can include its own interchangeable alignment assembly 730 which can be fitted onto adjustable takeoff platform 700 prior to use. The interchangeable assembly can be releasably secured to adjustable takeoff platform via a press fit, fasteners, screws, clips, etc.

Figure 7A:
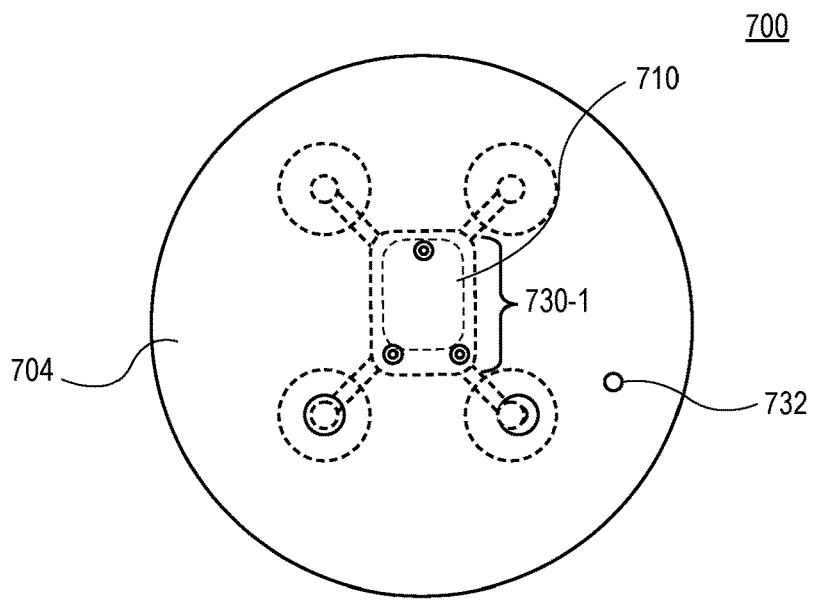
FIGS. 7A through 7E are views of aspects of an exemplary adjustable takeoff platform in accordance with embodiments of the present disclosure.
Figure 7B:
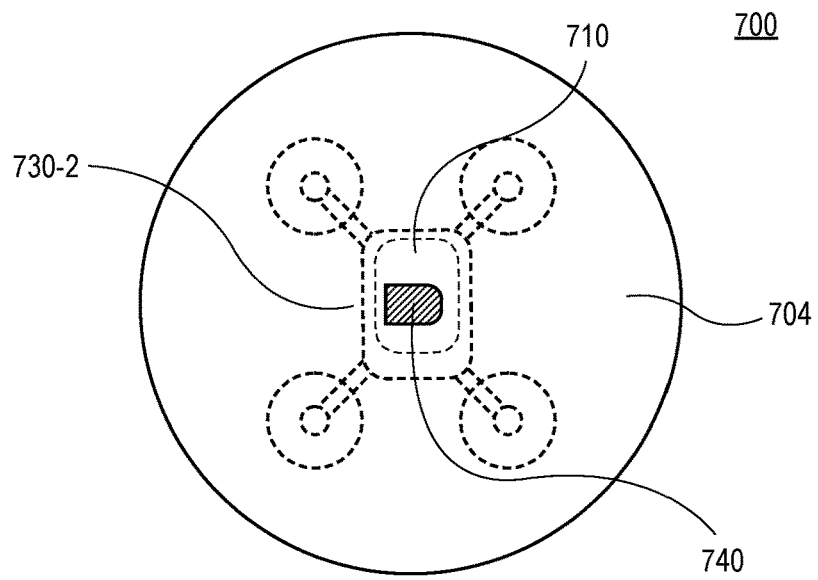
Figure 7C:
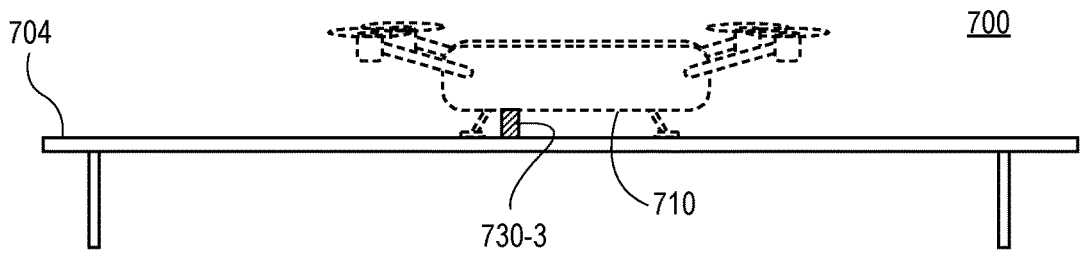
Figure 7D:
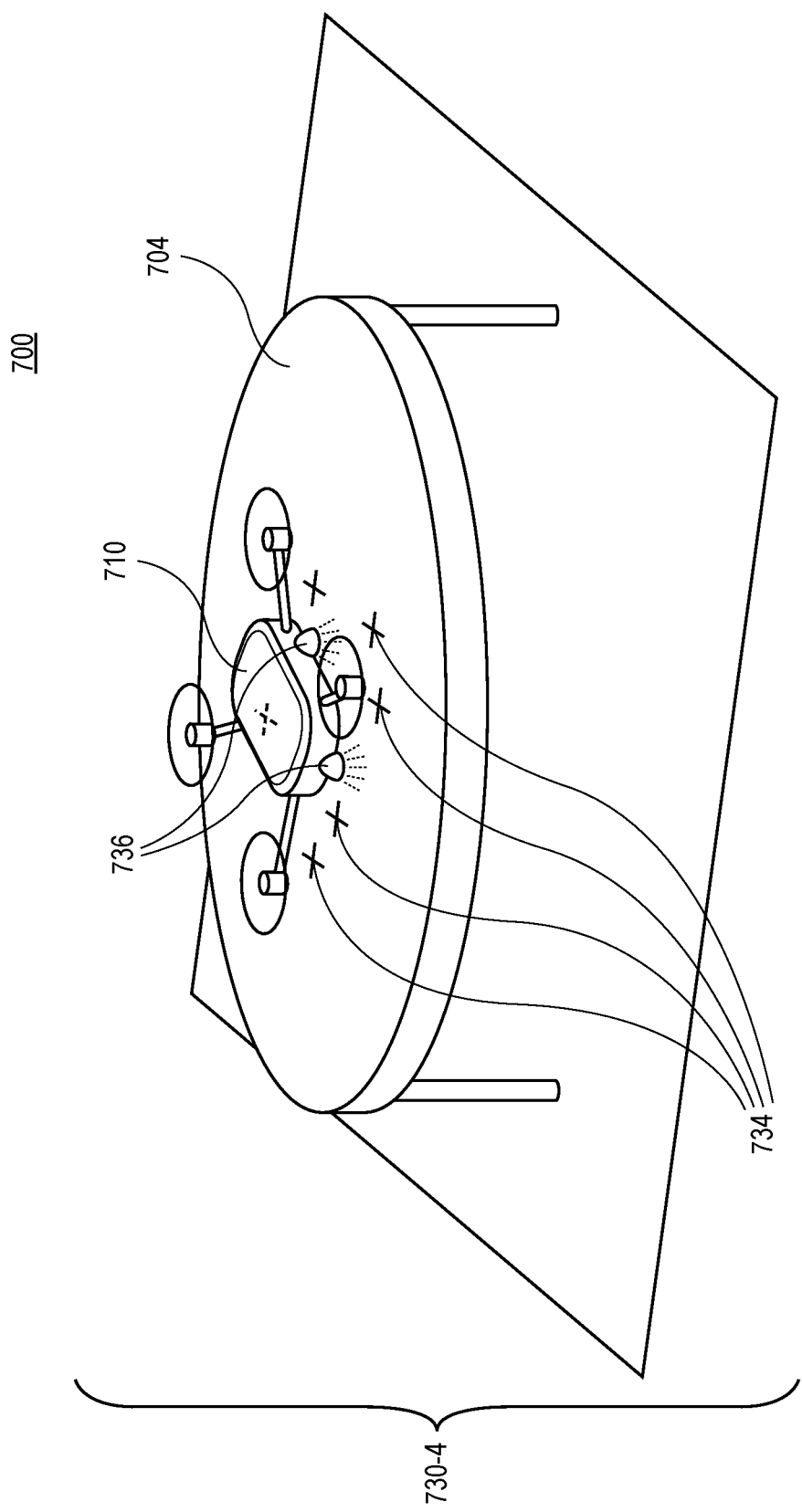

According to another embodiment of the present disclosure, as shown in FIG. 7D, alignment assembly 730-4 can include visual markings 734 and one or more imaging sensors 736. Imaging sensor(s) 736 can capture images of visual markings 734 after aerial vehicle 710 is placed on movable takeoff pad 704, and based on the images of visual markings 734, the relative position of aerial vehicle 710 to movable takeoff pad 704 can be determined. For example, the positioning, offset, etc. of visual markings 734 in the captured images can facilitate determining the relative positioning of aerial vehicle 710 to movable takeoff pad 704. The relative positioning of aerial vehicle 710 can then be transmitted to platform control system 120, and movable takeoff pad can be adjusted accordingly in view of the weather conditions and the relative positioning of aerial vehicle 710 to movable takeoff pad 704. Accordingly, in embodiments employing visual markings 734 and imaging sensor(s) 736, aerial vehicle 710 does not need to be placed in a known orientation relative to movable takeoff pad 704. For example, any adjustments to a heading, pitch, and/or roll of aerial vehicle 710 can consider the relative position of aerial vehicle 710 to movable takeoff pad 704 and incorporate this relative positioning in adjusting the position of movable takeoff pad 704 and aerial vehicle 710 to compensate for such relative positioning.

According to certain embodiments, visual markings 734 can be disposed on movable takeoff pad 704 and imaging sensor(s) 736 can be disposed on aerial vehicle 710. Accordingly, once aerial vehicle 710 is placed on movable takeoff pad 704, imaging sensor(s) 736 can capture one or more images of visual markings 734. The images of visual markings 734 can be transmitted, for example, to platform control system 120, which can determine the relative position of aerial vehicle 710 to movable takeoff pad 704 based on the images of visual markings 734. Alternatively, visual markings 734 can be disposed on aerial vehicle 710 and imaging sensor(s) 736 can be disposed on movable takeoff pad 704. Accordingly, once aerial vehicle 710 is placed on movable takeoff pad 704, imaging sensor(s) 736 can capture one or images of visual markings 734. Then, platform control system 120 can determine the relative position of aerial vehicle 710 to movable takeoff pad 704 based on the images of visual markings 734.

Figure 7E:
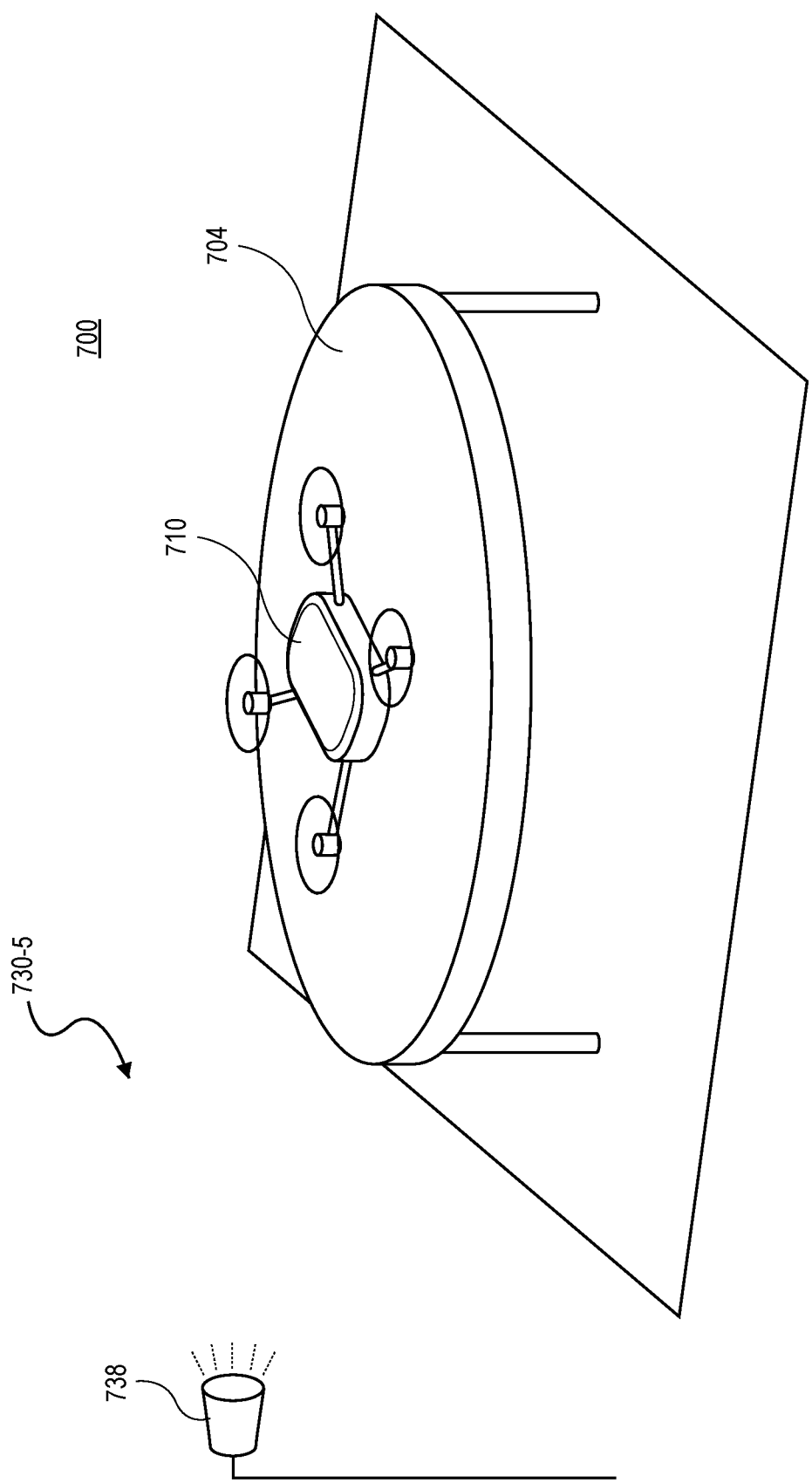

According to yet another embodiment of the present disclosure, as shown in FIG. 7E, alignment assembly 730-5 can include one or more imaging sensors 738. Imaging sensor(s) 738 can be disposed at a distance from adjustable takeoff platform 700 and aerial vehicle 710. After aerial vehicle 710 is placed on movable takeoff pad 704, imaging sensor(s) 738 can capture images of aerial vehicle 710 and movable takeoff pad 704, and the relative position of aerial vehicle 710 to movable takeoff pad 704 can be determined. For example, the positioning, offset, etc. of aerial vehicle 710 relative to takeoff pad 704 in the captured images can facilitate determining the relative positioning of aerial vehicle 710 to movable takeoff pad 704. The relative positioning of aerial vehicle 710 can then be transmitted to platform control system 120, and movable takeoff pad can be adjusted accordingly in view of the weather conditions and the relative positioning of aerial vehicle 710 to movable takeoff pad 704. Accordingly, in embodiments employing imaging sensors 738, aerial vehicle 710 does not need to be placed in a known orientation relative to movable takeoff pad 704. For example, any adjustments to a heading, pitch, and/or roll of aerial vehicle 710 can incorporate the positioning of aerial vehicle 710 relative to movable takeoff platform 704 to compensate for the relative positioning of aerial vehicle 710.

Optionally, alignment assembly 730 can include alignment indicator 732 which can notify an operator or provide an instruction to platform control system 120 when aerial vehicle 710 is properly positioned on adjustable takeoff platform 700. According to certain embodiments, indicator 732 can be a light, or an indication on a user interface of a software application, or an instruction and/or command that is sent to platform control system 120 to indicate that aerial vehicle 710 is properly positioned on adjustable takeoff platform 700. According to certain exemplary embodiments, takeoff of aerial vehicle 710 can be prevented until alignment indicator 732 indicates that aerial vehicle 710 has been properly positioned on adjustable takeoff platform 700.

According to certain embodiments, placement and positioning of aerial vehicle 710 on movable takeoff pad 704 can be an automated process. For example, aerial vehicle 710 can be placed and positioned on movable takeoff pad 704 by a robotic arm or other assemblies to facilitate operation of adjustable takeoff platform 700 and aerial vehicle 710. According to certain embodiments, the assemblies for positioning aerial vehicle 710 on adjustable takeoff platform 700 can be automated to facilitate operation of adjustable takeoff platform 700 and/or aerial vehicle 710 with minimal or no user interaction. According to yet another embodiment, the assemblies for positioning aerial vehicle 710 onto adjustable takeoff platform 700 can also be used to load and/or unload a payload onto/from aerial vehicle 710. For example, a robotic arm that can position aerial vehicle 710 onto adjustable takeoff platform 700 can also be used to load and/or unload a payload onto/from aerial vehicle 710. Alternatively, a separate assembly can be provided that can load and/or unload a payload onto/from aerial vehicle 710. According to yet another embodiment, adjustable takeoff platform 700 can include assemblies (e.g., cables, connectors, etc.) to facilitate providing power (e.g., charging batteries) to aerial vehicle 710. According to one embodiment, alignment assembly 730 can include a power interface that can allow charging of aerial vehicle 710 while also facilitating proper positioning of aerial vehicle 710 on adjustable takeoff platform 700.

Figure 8:
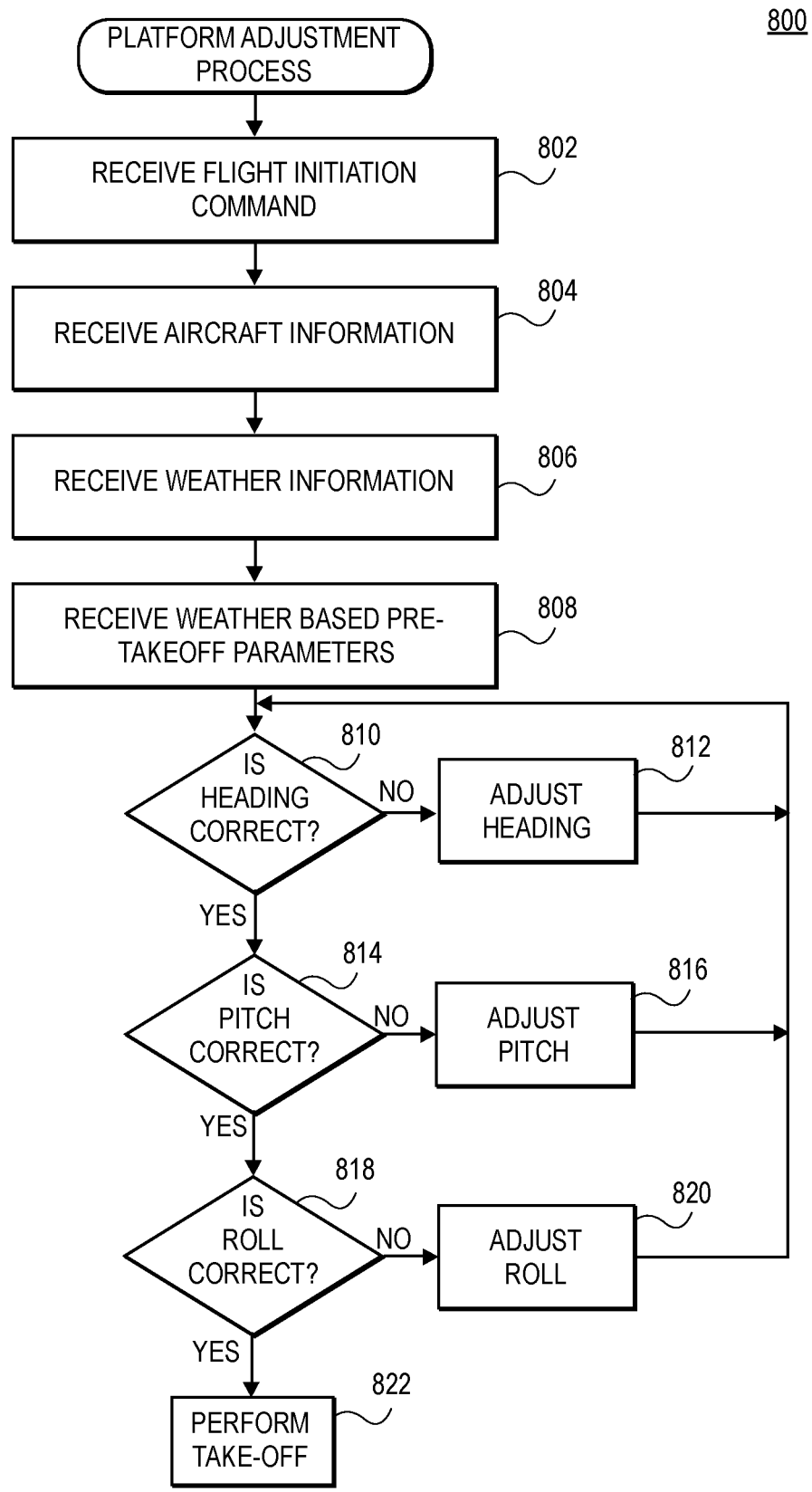
FIG. 8 is a block flow diagram of an exemplary platform adjustment process in accordance with embodiments of the present disclosure.

FIG. 8 is a flow diagram of an exemplary platform adjustment process 800 according to embodiments of the present disclosure. As shown in FIG. 8, process 800 can begin with step 802 upon receipt of command or instruction to initiate a flight of an aerial vehicle. For example, the command or instruction to initiate flight may be received by platform control system 120 from a remote computing resource that controls and/or manages the flight of the aerial vehicle. After the flight initiation command or instruction has been received, aircraft information associated with the aerial vehicle to perform the flight and weather information at the takeoff location are received in steps 804 and 806 (e.g., from platform control system 120 and weather station 140). The aircraft information can include, for example, an aircraft identifier, a flight plan, aerodynamic characteristics of the aerial vehicle, a heading of the aerial vehicle for various weather conditions (e.g., wind direction, wind magnitude, barometric pressure, humidity, temperature, etc.), a pitch of the aerial vehicle for various weather conditions (e.g., wind direction, wind magnitude, barometric pressure, humidity, temperature, etc.), and/or a roll of the aerial vehicle for various weather conditions (e.g., wind direction, wind magnitude, barometric pressure, humidity, temperature, etc.). Weather information can include, for example, temperature, relative humidity, barometric pressure, precipitation, visibility, dew point, etc., at the takeoff location. Further, the weather information can include, for example, the current weather conditions at the takeoff location. Alternatively, or in addition, the weather information can include anticipated forecast weather conditions for the time at which the aerial vehicle is expected to takeoff. According to other embodiments, the weather information can include processed weather data at the takeoff location. For example, the processed weather data can include an averaged wind direction and magnitude over the last 1 minute, 5 minutes, 10 minutes, 15 minutes, 30 minutes, 1 hour, or other time period. The aircraft information can be stored locally or at a remote computing resource. Similarly, the weather information can be received from a remote computing resource (e.g., NOAA/national weather service, other weather monitoring stations, etc.) or from a local weather station disposed at the takeoff location with adjustable takeoff platform 100. According to other exemplary embodiments, adjustable takeoff platform 100 can include various weather sensors (e.g., to measure the direction and magnitude of the wind, the temperature, the barometric pressure, the humidity, etc.) to measure the weather conditions being experienced at adjustable takeoff platform 100 itself.

Based on the weather information and aerial vehicle information, pre-takeoff parameters (e.g., heading, pitch, and/or roll) for the aerial vehicle can be received in step 808 for the given weather conditions (e.g., wind direction and magnitude). For example, the pre-takeoff parameters can be received by platform control system 120. Alternatively, the pre-takeoff parameters can be stored in a datastore in platform control system 120 (e.g., operational data 128). After the pre-takeoff parameters have been received, movable takeoff pad 104 of adjustable takeoff platform 100 can be adjusted (e.g., rotated and angled in one or more directions) such that the aerial vehicle has a heading, pitch, and/or roll as indicated in the pre-takeoff parameters in preparation for takeoff. For example, platform control system 120 can send an instruction to adjustment assembly 106-1 (or tilting assemblies 106-3 and/or 106-4) to cause a rotation and/or an angular adjustment of movable takeoff pad 104. The instruction sent to cause the rotation and/or adjustment of the angle of movable takeoff pad 104 can specify, for example, current weather conditions, an angle of rotation, a direction of rotation, an angle of adjustment, a direction of angular adjustment, a heading, pitch and/or roll for aerial vehicle 110, aerodynamic characteristics of aerial vehicle 110, mass properties of aerial vehicle 110 (e.g., mass, moment of inertia, location of center of gravity, etc.), a time at which to perform the adjustment, etc. Upon receipt of the instruction to rotate and/or adjust the angle of movable takeoff pad 104, adjustment assembly 106-1 (or tilting assemblies 106-3 and/or 106-4) can rotate and/or adjust the angle of movable takeoff pad 104 in accordance with the received instructions. As the adjustments are made, adjustable takeoff platform 100 can confirm whether the aerial vehicle preparing for takeoff is positioned with the pre-takeoff parameters for the given weather conditions, in steps 810-820. For example, in steps 810, 814, and 818, it can be determined whether aerial vehicle 110 has been positioned in accordance with the pre-takeoff parameters. For example, in step 810, it can be determined whether the aerial vehicle 110 has been positioned with the correct heading. Similarly, in steps 814 and 818, it can be determined whether the aerial vehicle 110 has been positioned with the correct pitch and roll, respectively. If any of the heading, the pitch, and the roll are not in accordance with the pre-takeoff parameters, the heading, pitch, and/or roll can be adjusted in steps 812, 816, and 820, respectively. According to certain embodiments, the adjustments to orient the heading, pitch, and/or roll of aerial vehicle can be performed serially. Alternatively, the adjustments to aerial vehicle's heading, pitch, and/or roll can be performed in parallel. Also, all three of heading, pitch, and roll may not need to be adjusted for every aircraft. For example, based on the aerodynamic characteristics of aerial vehicle 110, only a heading, only a pitch, only a roll, only a heading and a pitch, or any combination thereof, may need to be adjusted. After it is confirmed that the heading, pitch, and/or roll of the aerial vehicle are in accordance with the pre-takeoff parameters, a takeoff command or instruction may be received in step 822.

Figure 9:
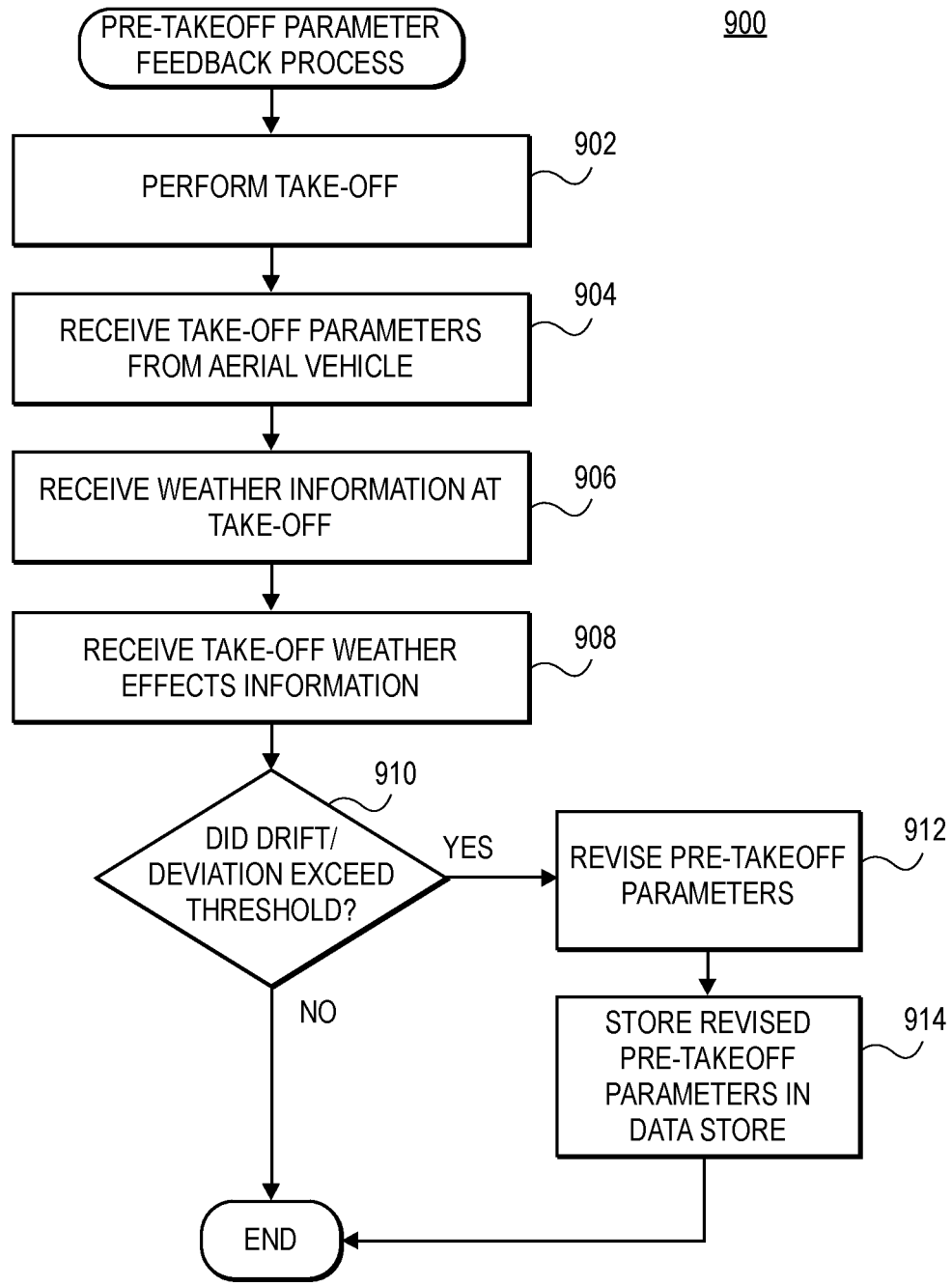
FIG. 9 is a block flow diagram of an exemplary pre-takeoff parameter feedback process in accordance with embodiments of the present disclosure.

FIG. 9 is a flow diagram of an exemplary pre-takeoff parameter feedback process 900 according to embodiments of the present disclosure. As shown in FIG. 9, process 900 can begin with step 902 upon takeoff of an aerial vehicle. Upon takeoff of the aerial vehicle, the takeoff parameters (e.g., heading, pitch, and/or roll) utilized at takeoff and the weather conditions present at takeoff can be received in steps 904 and 906. According to certain embodiments, this information may be received by platform control system 120. Accordingly, the aerial vehicle may have taken off, in step 902, with the heading, pitch, and/or roll defined by the pre-takeoff parameters. After takeoff, actual takeoff information can be received in step 908 regarding the effect that the weather conditions may have had at takeoff. For example, the takeoff weather effects information can include a direction and/or magnitude of drift or deviation from the intended flight plan that the aerial vehicle may have experienced at takeoff. This information can be received, for example, by platform control system 120. In step 910, the pre-takeoff parameters can be assessed against the actual weather conditions (which may have been received in step 906) that were present at takeoff. For example, it can be determined in step 910 whether a drift or deviation from a planned flight path during takeoff exceeds a threshold. The threshold may be any defined amount or value and may vary for different aerial vehicles and/or different weather conditions. For example, during some weather conditions (e.g., wind below 3 m/s) the threshold may allow for up to 0.5 meters of draft from a planned flight path. During other weather conditions (e.g., wind between 3-10 m/s) the threshold may allow for up to a meter of drift.

In some examples, if the threshold is exceeded, it may be determined whether the experienced drift and/or deviation was the result of the pre-take off parameters or if there was unexpected weather at the time of takeoff (e.g., unexpected gust of wind). If it is determined that the drift and/or deviation was a result of the pre-takeoff parameters, the pre-takeoff parameters can be revised for the aerial vehicle for the weather conditions experienced at takeoff (step 912). These revised pre-takeoff parameters can then be stored for future takeoffs (e.g., as aircraft information in platform control system 120) in step 914.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 8 and 9, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially," represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. An adjustable takeoff platform apparatus, comprising:
a frame;
a takeoff pad operatively coupled to the frame, wherein an aerial vehicle disposed on the takeoff pad can perform a takeoff in a substantially vertical direction from the adjustable takeoff platform;
a rotation assembly coupled to the takeoff pad, wherein the rotation assembly rotates the takeoff pad about an axis of rotation;
a tilting assembly coupled to the takeoff pad, wherein the tilting assembly varies an angle of the takeoff pad relative to a substantially horizontal plane; and
a platform control system including a processor and program instructions that, when executed by the processor, cause the processor to at least:
receive an aircraft identifier associated with the aerial vehicle;
receive a weather identifier;
determine a takeoff heading and a takeoff pitch based at least in part on the aircraft identifier and the weather identifier;
send a first instruction to the rotation assembly instructing the rotation assembly to rotate the takeoff pad so that a heading of the aerial vehicle substantially aligns with the takeoff heading; and
send a second instruction to the tilting assembly instructing the tilting assembly to vary the angle of the takeoff pad so that a pitch of the aerial vehicle substantially aligns with the takeoff pitch.

2. The adjustable takeoff platform of claim 1, further comprising:
a second tilting assembly coupled to the takeoff pad, wherein the second tilting assembly varies a second angle of orientation of the takeoff pad in a second direction relative to the substantially horizontal plane.

3. The adjustable takeoff platform apparatus of claim 1, wherein the weather identifier includes at least one of a wind direction or a wind magnitude.

4. The adjustable takeoff platform apparatus of claim 1, further comprising an alignment assembly to facilitate positioning of the aerial vehicle in a predetermined orientation relative to the takeoff pad.

5. The adjustable takeoff platform of claim 4, wherein the alignment assembly includes at least one of:
a visual marking for alignment with one or more components of the aerial vehicle;
a keyed extension received by an alignment recess of the aerial vehicle;
a keyed recess to receive an alignment element of the aerial vehicle;
an optical sensor; or
an electromagnetic sensor.

6. An adjustable takeoff platform apparatus, comprising:
a control system including a processor and program instructions that, when executed by the processor, cause the processor to at least:
receive a weather identifier; and
determine a takeoff heading and a takeoff pitch based at least in part on the weather identifier;
a takeoff pad, wherein an aerial vehicle disposed on the takeoff pad can perform a takeoff in a substantially vertical direction from the adjustable takeoff platform;
a rotation assembly coupled to the takeoff pad, wherein the rotation assembly rotates the takeoff pad about an axis of rotation to align the aerial vehicle with the takeoff heading associated with the aerial vehicle; and
a first tilting assembly coupled to the takeoff pad, wherein the first tilting assembly varies a first angle of the takeoff pad in a first direction relative to a substantially horizontal plane to align the aerial vehicle with the takeoff pitch associated with the aerial vehicle.

7. The adjustable takeoff platform apparatus of claim 6, further comprising a second tilting assembly coupled to the takeoff pad, wherein the second tilting assembly varies a second angle of orientation of the takeoff pad in a second direction relative to the substantially horizontal plane.

8. The adjustable takeoff platform apparatus of claim 6, further comprising an alignment assembly to facilitate positioning of the aerial vehicle in a predetermined orientation relative to the takeoff pad.

9. The adjustable takeoff platform apparatus of claim 8, wherein the alignment assembly includes at least one of a keyed extension having an asymmetrical cross-section received by a complementary alignment recess of the aerial vehicle or a keyed recess having an asymmetrical cross-section to receive a complementary alignment element of the aerial vehicle.

10. The adjustable takeoff platform apparatus of claim 6, wherein:

the program instructions that, when executed by the processor, further cause the processor to receive an aircraft identifier associated with the aerial vehicle; and
the takeoff heading and the takeoff pitch are further determined based at least in part on the aircraft identifier.

11. The adjustable takeoff platform apparatus of claim 10, wherein the rotation assembly includes a servomotor that rotates the takeoff pad to align a heading of the aerial vehicle with the takeoff heading.

12. The adjustable takeoff platform apparatus of claim 11, wherein the first tilting assembly includes a second servomotor that varies the first angle of the takeoff pad in the first direction relative to the substantially horizontal plane to align a pitch of the aerial vehicle with the takeoff pitch.

13. The adjustable takeoff platform apparatus of claim 11, wherein:
the control system further determines a takeoff roll based at least in part on the aircraft identifier and the weather identifier; and
the first tilting assembly includes a second servomotor that varies a second angle of orientation of the takeoff pad to align a roll of the aerial vehicle with the takeoff roll.

14. The adjustable takeoff platform apparatus of claim 6, wherein the weather identifier includes at least one of a wind direction or a wind magnitude.

15. The adjustable takeoff platform apparatus of claim 6, further comprising a locking assembly that releasably secures the aerial vehicle to the takeoff pad.

16. An adjustable takeoff platform, comprising:
a takeoff pad from which an aerial vehicle is to takeoff in a substantially vertical direction;
at least one assembly configured to at least one of:
rotate the takeoff pad about an axis of rotation; or
adjust a first angle of the takeoff pad; and
a platform control system including a processor and program instructions that, when executed by the processor, cause the processor to at least:
cause the at least one assembly to at least one of:
rotate the takeoff pad to align a heading of the aerial vehicle with a takeoff heading; or
adjust the first angle of the takeoff pad to align a pitch of the aerial vehicle with a takeoff pitch,
wherein the takeoff heading and the takeoff pitch are based at least in part on at least one of an aircraft identifier associated with the aerial vehicle or a weather identifier associated with current weather conditions.

17. The adjustable takeoff platform of claim 16, further comprising an alignment assembly to facilitate positioning of the aerial vehicle on the takeoff pad.

18. The adjustable takeoff platform of claim 16, wherein:
the at least one assembly is further configured to adjust a second angle of the takeoff pad.

19. The adjustable takeoff platform of claim 18, wherein the program instructions of the platform control system include further instructions that, when executed by the processor, further cause the processor to at least:
adjust the second angle of the takeoff pad to align a roll of the aerial vehicle with a takeoff roll.

20. The adjustable takeoff platform of claim 16, wherein the weather identifier includes at least one of a wind direction or a wind magnitude.

* * * * *